United States Patent
Reed et al.

(10) Patent No.: US 10,656,238 B2
(45) Date of Patent: *May 19, 2020

(54) ASSET TRACKING

(71) Applicant: FOOTMARKS, INC., Bellevue, WA (US)

(72) Inventors: Ryan Preston Reed, Newcastle, WA (US); Jared Klassen, Beaux Arts, WA (US)

(73) Assignee: Footmarks, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/678,467

(22) Filed: Nov. 8, 2019

(65) Prior Publication Data
US 2020/0110149 A1   Apr. 9, 2020

Related U.S. Application Data

(63) Continuation of application No. 16/258,423, filed on Jan. 25, 2019, now Pat. No. 10,509,100.

(60) Provisional application No. 62/741,333, filed on Oct. 4, 2018.

(51) Int. Cl.
*G01S 5/02* (2010.01)
*G01S 19/03* (2010.01)
*H04W 4/02* (2018.01)

(52) U.S. Cl.
CPC ............ *G01S 5/0294* (2013.01); *G01S 19/03* (2013.01); *H04W 4/023* (2013.01)

(58) Field of Classification Search
CPC .................................................. G01S 5/0294
USPC ....................................................... 702/150
See application file for complete search history.

(56) References Cited

U.S. PATENT DOCUMENTS

| | | |
|---|---|---|
| 6,837,427 B2 | 1/2005 | Overhultz et al. |
| 7,423,516 B2 | 9/2008 | Overhultz |
| 8,408,457 B2 | 4/2013 | Overhultz et al. |
| 9,990,644 B2 | 6/2018 | Walden |
| 2014/0249928 A1 | 9/2014 | McMillan et al. |
| 2016/0142884 A1* | 5/2016 | Sears ............... H04W 4/90 455/404.2 |
| 2017/0018184 A1* | 1/2017 | Northrup ............ G08G 1/144 |
| 2017/0064667 A1* | 3/2017 | Mycek ............. H04B 17/318 |
| 2017/0228776 A1* | 8/2017 | Walden ........... G06Q 30/0259 |
| 2018/0033244 A1* | 2/2018 | Northrup ............ H04W 4/21 |

(Continued)

OTHER PUBLICATIONS

Office action for U.S. Appl. No. 16/258,423, dated May 15, 2019, Reed, "Asset Tracking", 17 pages.

(Continued)

*Primary Examiner* — Ricky Ngon
(74) *Attorney, Agent, or Firm* — Lee & Hayes, P.C.

(57) ABSTRACT

Disclosed herein are techniques and systems for tracking assets using wireless beacons attached to the assets. In some embodiments, an asset tracking system may receive, from a mobile device, a first device identifier (ID) of a first wireless beacon that is presently associated with a site. At a different time, the asset tracking system may receive, from the mobile device, a second device ID of a second wireless beacon. The asset tracking system may determine whether a time between the receiving of the two device IDs is less than a threshold amount of time, and, if so, the asset tracking system may associate the wireless beacon to the site.

20 Claims, 15 Drawing Sheets

(56) References Cited

U.S. PATENT DOCUMENTS

2018/0109928 A1\* 4/2018 Walden .................... G06T 7/70
2019/0205936 A1\* 7/2019 Lal ......................... H04W 4/33

OTHER PUBLICATIONS

The PCT Search Report and Written Opinion dated Nov. 1, 2019 for PCT Application No. PCT/US2019/054108, 9 pages.
Non Final Office Action dated Dec. 30, 2019 for U.S. Appl. No. 16/678,633 "Asset Tracking" Reed, 6 pages.

\* cited by examiner

ASSET TRACKING

RELATED APPLICATIONS

This U.S. patent application is a continuation of and claims priority to commonly assigned, co-pending U.S. patent application Ser. No. 16/258,423, entitled "ASSET TRACKING," and filed on Jan. 25, 2019, which claims priority to commonly assigned U.S. provisional patent application Ser. No. 62/741,333, entitled "ASSET TRACKING USING ANCHORS," and filed on Oct. 4, 2018. Application Ser. Nos. 16/258,423 and 62/741,333 are fully incorporated herein by reference.

BACKGROUND

Companies launch promotional, advertising, or marketing campaigns that involve distributing large volumes of product displays to retail stores. These product displays typically hold or otherwise promote a product, and they can be made any suitable material, such as cardboard, plastic, or metal. When a large number of these product displays are distributed over a large geographical area to a large number of sites (e.g., retail stores), there is a challenge of knowing which product displays end up at which sites. Further, it is a challenge to know when a product display arrives at a site and the duration the product display was located at a site.

Prior attempts at tracking product displays involved attaching wireless beacons to the product displays, and deducing the location of the beacon (and hence, the product display) merely from a global positioning system (GPS) location reported by a mobile device that discovers a beacon in its vicinity. However, the GPS location of a mobile device can be quite inaccurate at times, making it difficult to pinpoint the true location of a beacon (and hence, the true location of a product display). Furthermore, retail sites can be densely packed within a relatively small area, such as when multiple retail stores are densely packed within city block or within a shopping mall. These scenarios make it even more difficult to determine the true location of a beacon (and hence, the true location of a product display) for asset tracking purposes.

Provided herein are technical solutions to improve and enhance these and other systems.

SUMMARY

Described herein are techniques and systems for tracking assets using wireless beacons that are attached to the assets. In an illustrative example, a plurality of wireless beacons may be attached to a plurality of assets that are to be tracked after they are distributed to various sites. In an example, these assets may be, without limitation, product displays made of cardboard, plastic, or metal that hold a promoted product, advertising signage, or another type of transient asset to be tracked. Each wireless beacon is associated with a device identifier (ID) that uniquely identifies the wireless beacon, and these identifiers, among other beacon data, is maintained by, and/or accessible to, an asset tracking system. For example, beacon data accessible to the asset tracking system may further include association data that associates the beacons with the assets to which they are attached, among other data, as described in more detail below. The asset tracking system may also maintain, and/or have access to, master site data about the various sites where the assets are to be delivered.

Meanwhile, users may carry mobile devices (e.g., smart phones, tablets, wearable computers, etc.) that are configured with logic (e.g., a software development kit (SDK)) to detect and interpret radio broadcasts from the wireless beacons. When such a mobile device discovers a wireless beacon broadcast from a beacon that has been deployed in the field, the mobile device can obtain, from one or more packets broadcasted by the beacon, a unique device ID of the beacon. At the time at which the mobile device discovers the wireless beacon's broadcast, the mobile device can also obtain global positioning system (GPS) data from the operating system of the mobile device. This GPS data may include at least a GPS location and an accuracy of that GPS location, which may be an estimated distance—measured in any suitable unit of distance (e.g., meters, feet, etc.)—that indicates a maximum error of the reported GPS location. The mobile device may send the device ID of the beacon and the GPS data (asset tracking data) to the asset tracking system over a computer network (e.g., WiFi, cellular, satellite, etc.).

Upon receiving the asset tracking data from a mobile device, depending on whether the beacon is presently associated with a site or not, the asset tracking system may run an algorithm to determine whether to associate (or dissociate) a wireless beacon (and hence, the asset to which the beacon is attached) with (or from) a site. In an example process, the asset tracking data received from a mobile device includes GPS data of the mobile device and a device ID of a beacon, which is not presently associated with a site. In order to determine whether to associate the beacon (and hence, the asset) with a site, the asset tracking system may determine whether the accuracy of the GPS location included in the received asset tracking data satisfies an accuracy threshold. In an example, the accuracy threshold may be satisfied if a distance specified in the GPS accuracy data is less than a threshold distance. If the accuracy threshold is satisfied, the asset tracking system may identify, from among the sites in the master site data, the N sites that are closest to the GPS location, where N is a predetermined number. Identifying the N closest sites is an optional step that improves the efficiency of the algorithm by excluding farther-away sites from consideration. Each site may have its own static radius (i.e., a predetermined distance measured from the centroid coordinates of the site in any direction). This static radius may be based on the size of the site (where size is measured as the geographic area, or footprint, of the site). For example, larger sites may be assigned larger static radii, and smaller sites may be assigned smaller static radii. Accordingly, individual sites (e.g., the N closest sites) can be evaluated to determine whether the GPS location reported by the mobile device is within the static radius assigned to the site under evaluation. That is, the asset tracking system may determine whether a distance between the GPS location and the centroid coordinates of the site is less than or equal to the static radius assigned to the site. If the GPS location is within the static radius assigned to a site, that site qualifies for further consideration as the site with which the beacon (and hence, the asset) will be associated. If there is a single qualifying site after the evaluation of the N closest sites, the beacon can be associated with that single qualifying site. If there are multiple qualifying sites after the evaluation of the N closest sites, one of the qualifying sites may be selected as the site with which the beacon is associated. Any suitable selection algorithm can be utilized for this purpose. For example, the closest site to the GPS location may be selected as the site with which the beacon is associated. In some embodiments, the selection may be based on the size of the multiple qualifying sites (e.g., the selection algorithm may select a larger of two sites, even when the smaller of the two sites is closer than the larger site to the GPS location).

Also disclosed herein are asset tracking techniques and systems that use an anchor (e.g., a geofence, a secondary beacon with a known location, etc.) to associate (or dissociate) a wireless beacon (and hence, the asset to which the beacon is attached) with (or from) a site. Also disclosed herein are techniques and systems for sending targeted content to mobile devices using beacons associated with sites. The targeted content that is delivered to a mobile device may relate to an asset, such as a product display, to which a nearby wireless beacon is attached.

The techniques and systems disclosed herein improve asset tracking by locating wireless beacons (and hence, the assets to which those beacons are attached) with improved accuracy, as compared to existing asset tracking techniques. For example, decisions as to whether to associate beacons with sites are reserved for those instances where the GPS accuracy reported by a mobile device satisfies an accuracy threshold. This leads to the mitigation of false positive results, which are results where the beacon is incorrectly associated with a site because the beacon is actually located elsewhere, such as a different site). Furthermore, the use of site-specific static radii that vary in length based on the respective sizes of the sites allows for a more robust asset tracking system that can better pinpoint the location of a wireless beacon, and hence, the asset to which the beacon is attached. The techniques and systems disclosed herein may also provide further technical benefits, such as conserving resources of the asset tracking system during runtime by excluding from consideration those sites that are not within a subset of the closest sites to a reported GPS location of a mobile device. Additional technical benefits are described elsewhere herein.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques and systems for tracking assets using wireless beacons. Although the techniques and systems disclosed herein are predominantly described with respect to implementation using wireless beacons that are based on Bluetooth Low Energy (BLE protocol), this disclosure is not limited to using BLE beacons, as other wireless communication protocols may be implemented with the techniques and systems disclosed herein, such as ZigBee, WiFi, and other similar wireless communication protocols. Moreover, the techniques and systems disclosed herein are described predominantly with respect to tracking assets in the form of product displays, but this disclosure is not limited to tracking product displays, nor is it limited to distributing assets to retail stores, as any other type of site is contemplated herein. In this sense, the techniques and systems disclosed herein may be used for tracking any suitable type of asset that could conceivably have a wireless beacon attached thereto.

Figure 1:
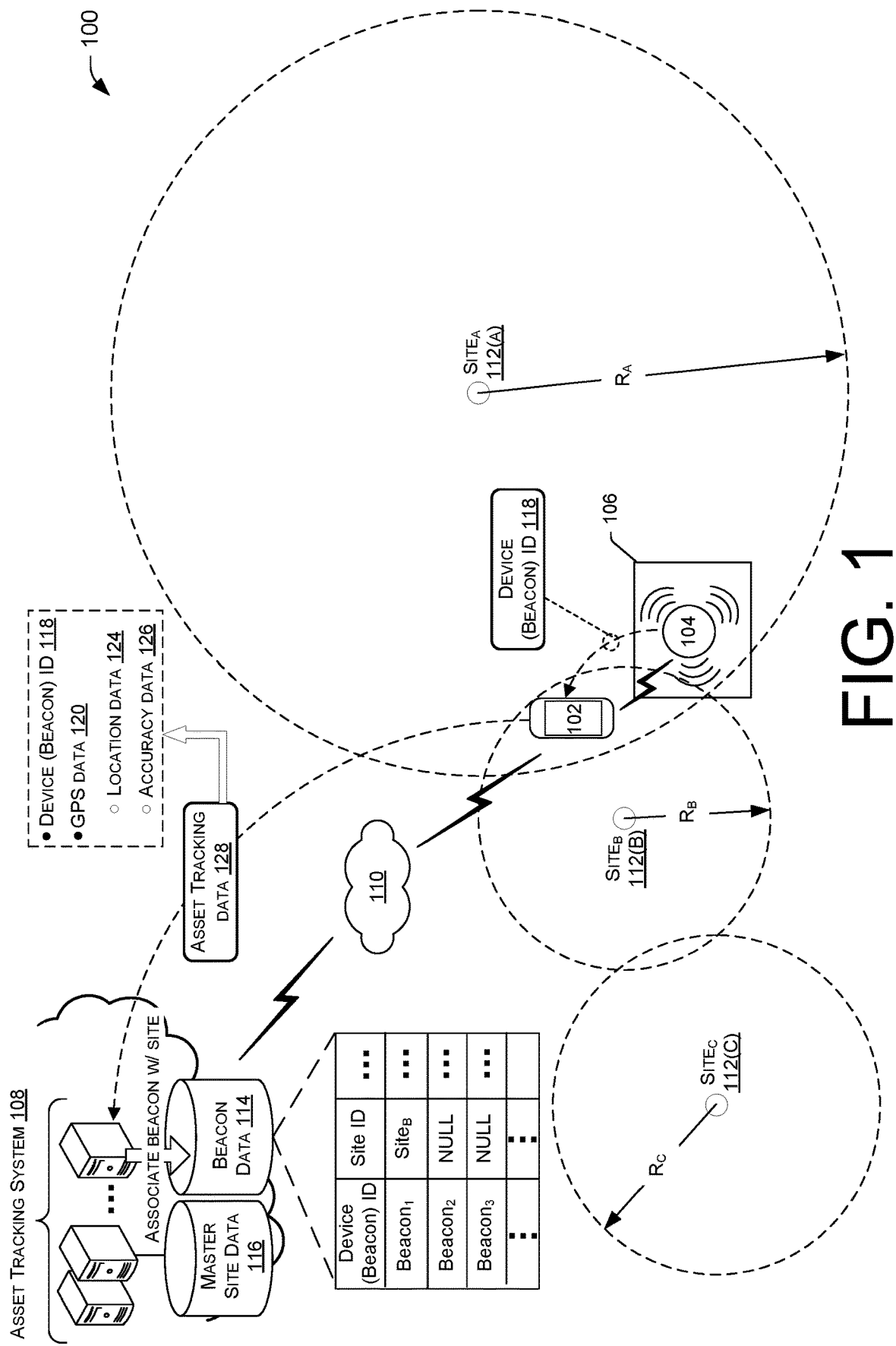
FIG. 1 illustrates an example environment including an example mobile device, an example wireless beacon, and an example asset tracking system that is configured to associate the wireless beacon with a site based, in part, on asset tracking data received from the mobile device.

FIG. 1 illustrates an example environment 100 including an example mobile device 102 (sometimes referred to as a mobile computing device 102, or a portable electronic device 102), an example wireless beacon 104 (sometimes abbreviated to beacon 104), an example asset 106 to be tracked, and an example asset tracking system 108 that, in the example of FIG. 1, is located at a geographically remote location with respect to the mobile device 102, the beacon 104, and the asset 106.

In some embodiments, the beacon 104 may be configured to broadcast packets as part of a recognition process. The undirected broadcast of the packets may be available for reception by properly-configured mobile devices, such as the mobile device 102, when these mobile devices are within a transmission range of the beacon 104. The beacon 104 may operate using any suitable wireless communication protocol, including a low energy protocol. One example low energy wireless protocol that is suitable transmitting packets between the beacon 104 and the mobile device 102 is BLE protocol. BLE uses short wavelength radio transmissions in the 2.4 gigahertz (GHz) Industrial, Scientific, and Medical (ISM) band at 2400-2483.5 megahertz (MHz) and uses 40 radio frequency (RF) channels that are 2 MHz wide. BLE can use a radio technology called frequency-hopping spread spectrum which chops up the data being sent and transmits chunks of it on the different channels. BLE transmission can have a variable range, such as about 50 meters, an over-the-air data rate of about 1 megabit per second (Mb/s), and a power consumption that is a fraction of the power consumption of Classic Bluetooth. BLE describes the operation of the link layer in terms of a state machine comprising multiple link layer states, including an advertising state, and a scanning state. The link layer in the advertising state can transmit advertising channel packets and can optionally listen to and respond to responses triggered by these advertising channel packets. A BLE device in the advertising state is known as an advertiser. The link layer in the scanning state can listen for advertising channel packets from devices that are advertising. A device in the scanning state is known as the scanner. In FIG. 1, the beacon 104 may represent an advertiser and the mobile device 102 may represent a scanner.

The mobile device 102 may be implemented as any suitable mobile computing device configured to communicate over a wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), and/or any similar mobile device 102. In addition to being configured with a short range radio, such as a Bluetooth radio, to communicate wirelessly with the beacon 104, the mobile device 102 may be capable of communicating wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), Institute of Electrical and Electronics Engineers (IEEE) 802.1x protocols, WiMAX, wireless fidelity (Wi-Fi'), and/or any future IP-based network technology or evolution of an existing IP-based network technology.

The mobile device 102 may include logic, such as a SDK, to detect and interpret broadcasted signals from the beacon 104, as well as logic to communicate with a remote, network-based or network-accessible asset tracking system 108. The asset tracking system 108 may, in some instances be part of a network-accessible computing platform that is maintained and accessible via a wide area network 110. Network-accessible computing platforms such as this may be referred to using terms such as "on-demand computing", "software as a service (SaaS)", "platform computing", "network-accessible platform", "cloud services", "data centers", and so forth. The asset tracking system 108 may be configured to provide particular functionality to large numbers of mobile devices of different users and a large number of beacons. The wide area network 110 is representative of any type of public or private, wide-area network, such as the Internet, which extends beyond the environment of the mobile device 102, the beacon 104, and the asset 106 when these devices are collocated at the same location. Thus, the wide area network 110 may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

Figure 2:
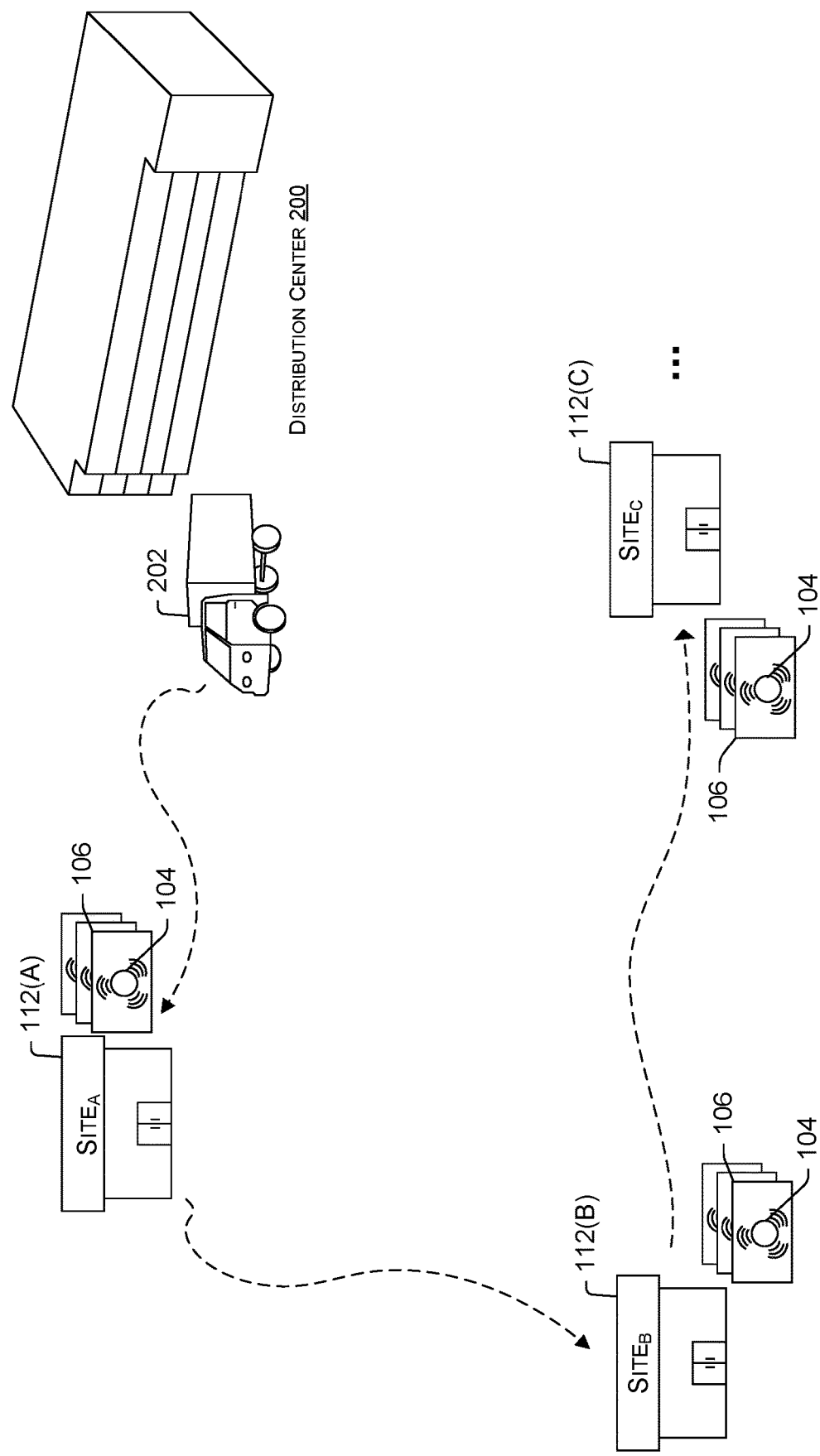
FIG. 2 illustrates a diagram showing an example of how beacons (and assets to which the beacons are attached) can be distributed to various sites.

In the example of FIG. 1, the beacon 104 is attached to an asset 106 to be tracked, and the asset 106 and beacon 104 have been distributed to a site 112. FIG. 1 shows three example sites 112(A), 112(B), and 112(C), and the asset 106 may have been delivered to any one of these sites 112, or to a different site 112 for that matter. Turning briefly to FIG. 2, an example of how beacons 104 (and assets 106 to which the beacons are attached) can be distributed to various sites 112 is described.

FIG. 2 shows a distribution center 200 where a plurality of assets 106 may be housed before they are distributed to sites 112. Beacons 104 may be attached to the assets 106 at any point, such as upstream from the distribution center 200 (e.g., during manufacture of the assets 106), at the distribution center 200, downstream from the distribution center 200, or any point in between. The beacons 104 can be configured for use in the field, and data about the beacons 104 and the assets 106 can be stored for later access and utilization by the asset tracking system 108 for asset tracking purposes. The assets 106 and the beacons 104 are distributed by a delivery vehicle 202, such as a delivery truck, to various sites 112, such as the sites 112(A), 112(B), and 112(C), shown in FIGS. 1 and 2. Once the assets 106 and beacons 104 arrive at the sites 112, they may be located anywhere within the sites 112. In the running example where assets 106 represent product displays, such as cardboard, plastic, or metal displays that hold or otherwise promote a product(s), these displays may be situated at (e.g., within or near) a site 112 so that consumers can see the product displays upon visiting the sites 112.

Figure 3:
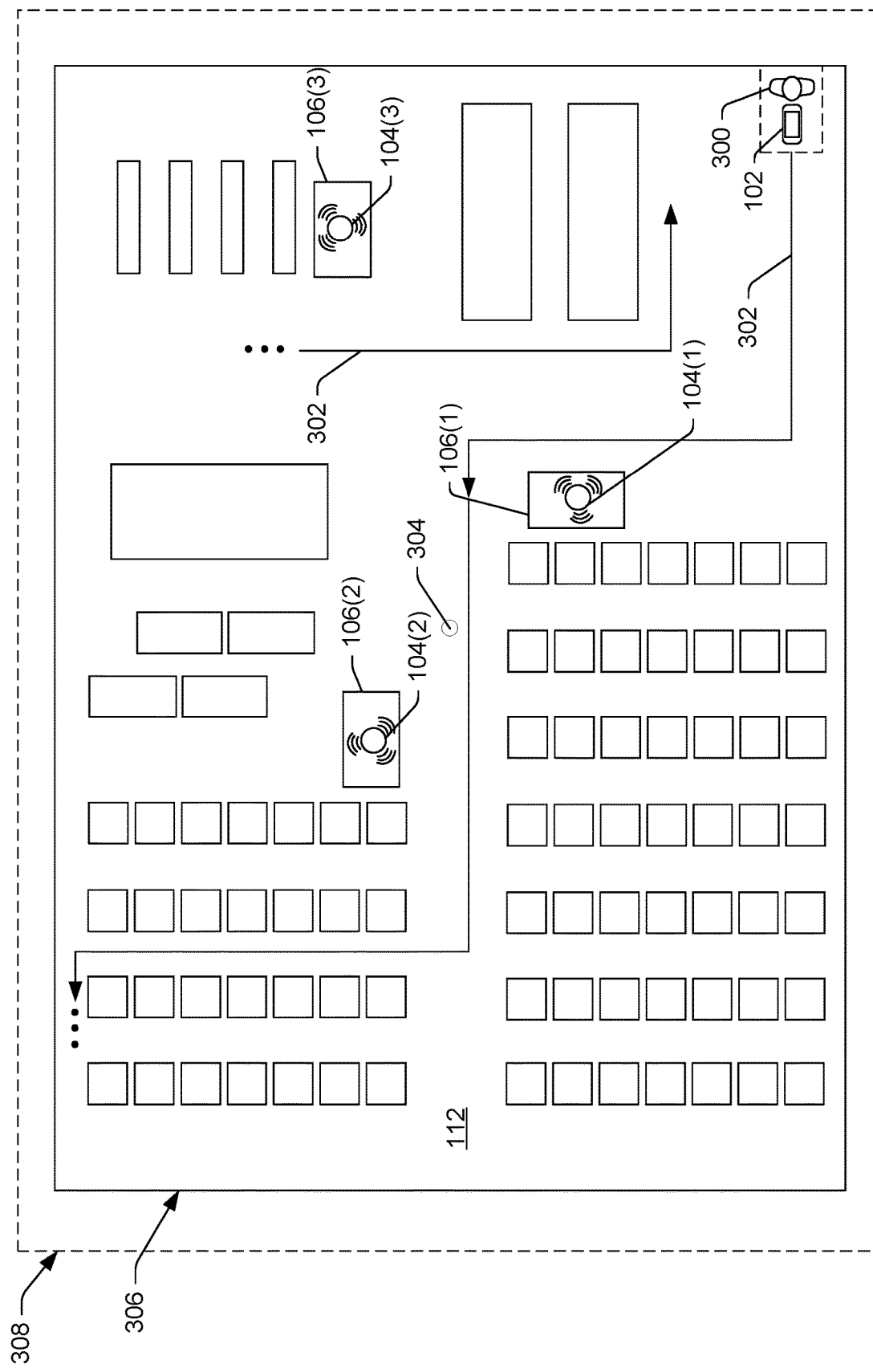
FIG. 3 illustrates a diagram showing an example of how a user might carry a mobile device within a site where multiple different wireless beacons are located.

FIG. 3 illustrates a diagram showing an example of how a user 300 might carry a mobile device 102 within a site 112 where multiple different wireless beacons 104 (and assets 106) are located. The user 300 might arrive at the site 112, and thereafter, the user 300 starts traversing path 302. As the mobile device 102 carried by the user 300 moves within transmission range of the first wireless beacon 104(1), the mobile device 102 receives a broadcast in the form of one or more packets from the beacon 104(1). Logic of the mobile device 102 is configured to extract, from the one or more packets, a device ID that uniquely identifies the wireless beacon 104(1). The logic of the mobile device 102 is also configured to obtain, from its operating system, GPS data including at least, and without limitation, a GPS location and an accuracy of the GPS location. The device ID and the GPS data can be sent to the asset tracking system 108 to associate the beacon 104(1) (and hence, the asset 106(1)) with a site, such as the site 112, or to dissociate the beacon 104(1) from the site 112, as the case may be. The discovery of the beacon broadcast by the mobile device 102 may not involve any user interaction by the user 300. As such, the user 300 can simply carry the mobile device 102 in his/her hand, a pocket, or a purse, and the mobile device 102, in idle mode, is configured to act as a scanner to detect and interpret broadcasts from the beacons 104, assuming the mobile device 102 is properly configured. The user 300 may have downloaded an application, or the mobile device 102 may be configured at manufacture, to discover and interpret beacon broadcasts. In some embodiments, the mobile device 102 may interact wirelessly with beacons 104 using a secure beacon broadcast, such as a multi-broadcast beacon signal that ensures the mobile device 102 is an authorized device before the device ID of the beacon 104 can be obtained. An example secure beacon broadcast is described in U.S. Pat. No. 9,866,389, entitled "MULTI-BROADCAST BEACON SIGNALS," the entirety of which is incorporated herein by reference. Hereafter, reference to a "secure beacon broadcast" can mean utilizing the techniques described in U.S. Pat. No. 9,866, 389.

As shown in FIG. 3, as the user 300 moves around the site 112 carrying his/her mobile device 102, the mobile device 102 may move within transmission range of the second beacon 104(2), and the asset tracking system 108 may determine whether to associate or dissociate the beacon 104(2) (and hence, the asset 106(2)) with or from a site, such as the site 112 in FIG. 3. This may involve a similar process as described above with respect to the first beacon 104(1). That is, the mobile device 102 may obtain the device ID of the second beacon 104(2) from a packet(s) broadcasted by the second beacon 104(2), and may obtain GPS data of the mobile device 102 for a second time. As shown by the ellipsis in FIG. 3, the user 300 can continue to traverse the path 302, which eventually brings the user 300 and his/her mobile device 102 near the third beacon 104(3), and the mobile device 102 may obtain and transmit asset tracking data (e.g., the device ID of the third beacon 104(3) and GPS data of the mobile device 102) to the asset tracking system 108, which determines whether to associate or dissociate the beacon 104(3) (and hence, the asset 106(3)) with or from a site, such as the site 112 in FIG. 3.

FIG. 3 also depicts a centroid 304 (e.g., centroid coordinates, such as latitude and longitude) defining the center of the site 112, which spans a two-dimensional area corresponding to a bounding shape (e.g., a box), which can be defined as a set of geographical coordinates (e.g., a set of latitude and longitude coordinates that define a boundary 306 of the site 112. As mentioned, any bounding shape can be used to define the bounds of a site 112, such as a circle, a rectangle, a square, a triangle, etc. In the example, a rectangular boundary 306 is shown, which may correspond to the actual property lines of the property on which the site 112 is disposed. The boundary 306 may include a physical structure (e.g., a building), as well as ancillary areas around the physical structure, such as a parking lot or garage. In some embodiments, the site 112 may be an outdoor site devoid of a structure like a building (e.g., an open-air market). The size of the site 112 may be defined as the two-dimensional area within the boundary 306 of the site 112. In a simple example where the boundary 306 is rectangular, the size of the site is the length multiplied by the width of the box-shaped boundary 306. As mentioned, sites 112 may vary in size. For example, a large grocery outlet (e.g., Walmart, Costco, or the like) may be much larger than a convenience store or a coffee stand. As such, the asset tracking system 108 may maintain data regarding the sizes of the sites 112 where assets 106 and beacons 104 can be located.

FIG. 3 also shows a geofence 306 that may be defined for the site 112. The geofence 308 may surround the boundary 306 of the site 112. In some embodiments, the geofence 308 may be defined to surround a physical structure on the site 112, such as a building or similar structure, within which beacons 104 and assets 106 may be located. Although the geofence 308 is shown as a rectangular bounding box in FIG. 3, it is to be appreciated that the geofence 308 can be defined as any shape (of a predefined geometry or a custom, arbitrary shape). The geofence 308 can be used to detect geofence entry and exit events by detecting when a GPS location reported by a mobile device 102 moves from outside of the geofence 308 to a location within the geofence 308, or vice versa. The use of geofences, such as the geofence 308, is described in more detail below.

Returning with reference to FIG. 1, an example asset tracking algorithm for associating beacons 104 (and hence, assets 106) with sites 112 is now described. As shown in FIG. 1, the asset tracking system 108 maintains, and/or has access to, beacon data 114 that indicates whether, and which, beacons 104 are associated with sites 112, and, if so, which sites 112. A "dissociated" beacon 104 is indicated as such in the beacon data 114 (e.g., by specifying a "NULL" value in a Site ID field of the beacon data 114). In general, the beacon data 114 accessible to the asset tracking system 108 may include, without limitation, device (beacon) IDs that each uniquely identify a wireless beacon 104, an asset type (e.g., product display) of an asset 106 to which the beacon 104 is (or will be) attached, revenue generated (e.g., mobile engagements tied to the beacon 104), weight of the beacon 104 and/or the asset 106, merchant ID (sometimes referred to as a division or a campaign), product type, etc. In an illustrative example, the beacon data 114 may indicate, for the beacon 104 of FIG. 1, a device ID of that beacon 104, the asset type of the asset 106 as a product display (e.g., a product display) the revenue generated that can be associated with that beacon 104, the weight of the beacon 104 and/or of the asset 106, a merchant ID that relates to the asset 106 (e.g., a brand, product line, company name, etc., such as Pepsi®), a product type (e.g., food or beverage, etc.).

The asset tracking system 108 may also maintain, and/or have access to, master site data 116 about sites 112 where assets, such as the asset 106, may be delivered and thereafter located. The master site data 116 may include, without limitation, site IDs that uniquely identify a site (e.g., a grocery store, a convenience store, a movie theater, or any similar type of site), a site's physical address (e.g., mailing or shipping address), geofencing coordinates of a site (e.g., latitude and longitude coordinates of a specified area around a physical space), centroid coordinates 304 of a site (e.g., latitude and longitude of the center of the physical space), a size of the site (e.g., a two-dimensional area), merchant IDs associated with the site (e.g., brands, product lines, company names, etc., and sometimes referred to as "divisions" or "campaigns"), a static radius assigned to a site, a static accuracy distance threshold of a site, etc.

Assume, in the example of FIG. 1, that the beacon 104 is initially dissociated from a site, and, as such, the beacon data 114 indicates that the beacon 104 is not associated with any site (e.g., by a "NULL" value in a site ID field for the beacon 104). When the mobile device 102 is carried by a user 300 such that it moves within transmission range of the wireless beacon 104, the mobile device 102 may obtain the device (beacon) ID 118 of the beacon 104, which uniquely identifies the beacon 104 to distinguish the beacon 104 from other beacons 104. The beacon 104 may broadcast packets periodically and/or in response to events (e.g., in response to detecting nearby mobile devices 102, etc.).

The mobile device 102 may obtain GPS data 120 from the operating system of the mobile device 102, which captures the present location of the mobile device 102 at or near a time when the beacon 104 is discovered by the mobile device 102. The GPS data 120 may include, without limitation, location data 124 specifying a GPS location (e.g., expressed in terms of coordinates, such as latitude and longitude), accuracy data 126 specifying an accuracy of the GPS location. In some embodiments, the accuracy data 126 may specify the accuracy of the GPS location as a distance metric (e.g., a number of meters, feet, etc.). The accuracy of the GPS location specified in the accuracy data 126 may indicate a maximum error of the reported GPS location. For example, if the accuracy of the GPS location specified in the accuracy data 126 is 1000 meters, this can be interpreted as an indication that the mobile device 102 actually might be located at a location that is up to 1000 meters from the GPS location specified in the location data 124.

The mobile device 102 sends asset tracking data 128 to the asset tracking system 108 over the computer network 110 at a time when the device ID 118 and the GPS data 120 is obtained, and the asset tracking data 128 includes at least the device ID 118 and the GPS data 120. In response to receiving the asset tracking data 128 from the mobile device 102 over the computer network 110, the asset tracking system 108 may run an algorithm to determine whether to associate the beacon 104 (identified by the device ID 118) with a site, or whether to dissociate the beacon 104 from a site, as the case may be. In the example, assume that the beacon 104 is presently dissociated from a site, and is to be associated with a site.

Initially, the asset tracking system 108 may determine whether the accuracy of the GPS location (specified in the accuracy data 126) satisfies an accuracy threshold. For example, the accuracy of the GPS location may be expressed as a distance, and the determination of whether the accuracy threshold is satisfied may involve determining whether the distance specified in the accuracy data 126 is less than a threshold distance. For example, if the accuracy threshold is set to 200 meters, and the accuracy of the GPS location specified in the accuracy data 126 is 150 meters, the accuracy threshold is satisfied in this scenario. By contrast, an accuracy of 250 meters specified in the accuracy data 126 would not satisfy the example accuracy threshold of 200 meters. In the latter case (where the accuracy threshold is not satisfied), the asset tracking system 108 may refrain from associating the beacon 104 with a site 112 altogether. This decision to forego associating the beacon 104 with a site is based on the notion that the GPS location reported by the mobile device 102 is too inaccurate, which may lead to a false-positive association of the beacon 104 with a site where the beacon is not actually located. If, however, the accuracy of the GPS location specified in the accuracy data 126 satisfies the accuracy threshold, the algorithm continues by identifying, from among the sites in the master site data 116, the N sites that are closest to the GPS location specified in the location data 124. Here, N is any suitable predetermined number (e.g., N=5; or the 5 closest sites). It is to be appreciated that identifying the N closest sites is an optional step that improves the efficiency of the algorithm by excluding farther-away sites from consideration.

Each site 112 may have its own static radius (i.e., a predetermined distance measured from the centroid coordinates 304 of the site in any direction). FIG. 1 shows that site 112(A) ($Site_A$) is assigned a static radius, $R_A$, site 112(B) ($Site_B$) is assigned a static radius, $R_B$, and site 112(C) ($Site_C$) is assigned a static radius, $R_C$. The static radius, R, assigned to a given site 112 may be based on the size (e.g., the two-dimensional geographic area) of the site 112. As such, the static radii of the sites 112 in the master site data 116 can vary by the respective sizes of the sites 112 in the master site data 116. For instance, sites 112 that cover a relatively large geographic area (e.g., warehouses, large shopping centers with correspondingly large parking lots, etc.) may be assigned larger static radii, and sites 112 that cover a relatively small geographic area (e.g., convenience stores, coffee stands, etc.) may be assigned smaller static radii. Accordingly, the site 112(A) may represent a large-sized site 112, such as a large grocery outlet or a warehouse that is relatively large in size (e.g., in terms of geographic area covered by the site), as indicated by its relatively large static radius, $R_A$, whereas the sites 112(B) and 112(C) may represent smaller-sized sites 112, such as convenience stores that are relatively small in size, as indicated by their relatively small static radii, $R_B$ and $R_C$, respectively.

If N is greater than three, the three sites 112(A), 112(B), and 112(C) may be included in the subset of the N closest sites 112 to the GPS location specified in the location data 124. The algorithm may continue by determining a first distance between the GPS location of the mobile device 102 and the centroid coordinates 304 of the site 112(A), and determining whether this first distance is less than or equal to the static radius, $R_A$, assigned to the site 112(A). In the example of FIG. 1, this first distance is indeed less than or equal to the static radius, $R_A$, and, as a result, the site 112(A) qualifies for further consideration as the site 112 with which the beacon 104 will be associated. The asset tracking system 108 may similarly evaluate the other sites 112 of the N closest sites. That is, the algorithm may continue by determining a second distance between the GPS location of the mobile device 102 and the centroid coordinates 304 of the site 112(B), and determining whether this second distance is less than or equal to the static radius, $R_B$, assigned to the site 112(B). In the example of FIG. 1, this second distance is indeed less than or equal to the static radius, $R_B$, and, as a result, the site 112(B) also qualifies for further consideration as the site 112 with which the beacon 104 will be associated. However, the algorithm may determine that a third distance between the GPS location of the mobile device 102 and the centroid coordinates 304 of the site 112(C) is greater than the static radius, $R_C$, assigned to the site 112(C). As a result, site 112(C) may not qualify for further consideration and may be excluded from consideration because the mobile device 102 is likely too far away from the site 112(C) (e.g., where "too far" means outside of the static radius, $R_C$, assigned to site 112(C)) to be considered as a candidate site 112.

In the example of FIG. 1, there are multiple qualifying sites after the evaluation of the N closest sites; namely site 112(A) and site 112(B). In this case, the asset tracking system 108 selects one of these qualifying sites as the site 112 to which the beacon 104 is associated. Any suitable selection algorithm can be utilized for this purpose. For example, the closest site to the GPS location specified in the location data 124 may be selected as the site to which the beacon 104 is associated. In the example of FIG. 1, the algorithm selects site 112(B) as the closest of the two qualifying sites 112(A) and 112(B). However, in some embodiments, the selection may be based on the other factors, such as the static accuracy distance thresholds assigned to each site. As mentioned, each site may be assigned a static accuracy distance threshold. This is a site-specific GPS accuracy threshold specified as a distance, and it may be used in the selection algorithm. In an illustrative example, the first site 112(A) may be assigned a first static accuracy distance threshold of 200 meters because the first site 112(A) may be large in size (e.g., a large department store), while the second site 112(B) may be assigned a second static accuracy distance threshold of 30 meters because the second site 112(B) may be small in size (e.g., a small convenience store) and because the second site 112(B) is close to the first site 112(A) in terms of the distance between the sites. In this case, the selection algorithm might filter out candidate sites if the GPS accuracy is greater than that site's static accuracy distance threshold. Continuing with the previous example, if the distance specified in the GPS accuracy data 126 is 150 meters, this distance may be compared to each static accuracy distance threshold for each candidate site, and, since 150 meters is greater than 30 meters (which is the static accuracy distance threshold assigned to the smaller, second site 112(B)), the second site 112(B) may be excluded from consideration as a site with which the beacon 104 is to be associated. Meanwhile, because 150 meters is less than 200 meters (which is the static accuracy distance threshold assigned to the larger, first site 112(A)), the first site 112(A) is kept as a candidate site. If multiple candidate sites remain, the closer site to the GPS location may be selected as the site to which the beacon 104 is associated. In practice, this means that the following situation may occur. Consider a case where the beacon 104 is located in a corner of a large grocery outlet (e.g., Walmart) represented by site 112(A), and on the other side of the wall of the grocery outlet there is a small convenience store represented by site 112(B). In this case, the beacon 104 (and a nearby mobile device 102) may be closer to the centroid coordinates 304 of the site 112(B) than the centroid coordinates 304 of the site 112(A), even though the beacon 104 is actually located within the site 112(A), simply by virtue of the fact that the site 112(A) spans a large geographical footprint, and another small site 112(B) may be located very close to the boundary 304 of the larger-sized site 112(A). To avoid associating the beacon 104 with the site 112(B) in this example, a relatively small static accuracy distance threshold may be assigned to the site 112(B). This may also prevent "ping-ponging" between sites 112 that are located very close to one another.

In any case, once the beacon 104 is associated with a site, such as the site 112(B) or the site 112(A), the beacon-to-site association may be stored in the beacon data 114 with respect to the beacon 104, and this association data may also be stored in the master site data 116. As such, the beacon data 114 may indicate sites 112 to which at least some of the beacons 104 are associated, and the master site data 116 may indicate one or more beacons 104 that have been associated with the sites 112. Other beacon-association and beacon-dissociation algorithms are described in more detail below with reference to the following figures. Furthermore, algorithms to deliver targeted content to mobile devices using beacons are also described in more detail below with reference to the following figures.

The processes described in this disclosure may be implemented by the architectures described herein, or by other architectures. These processes are illustrated as a collection of blocks in a logical flow graph, which represent a sequence of operations that can be implemented in hardware, software, firmware, or a combination thereof (i.e., logic). In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 4:
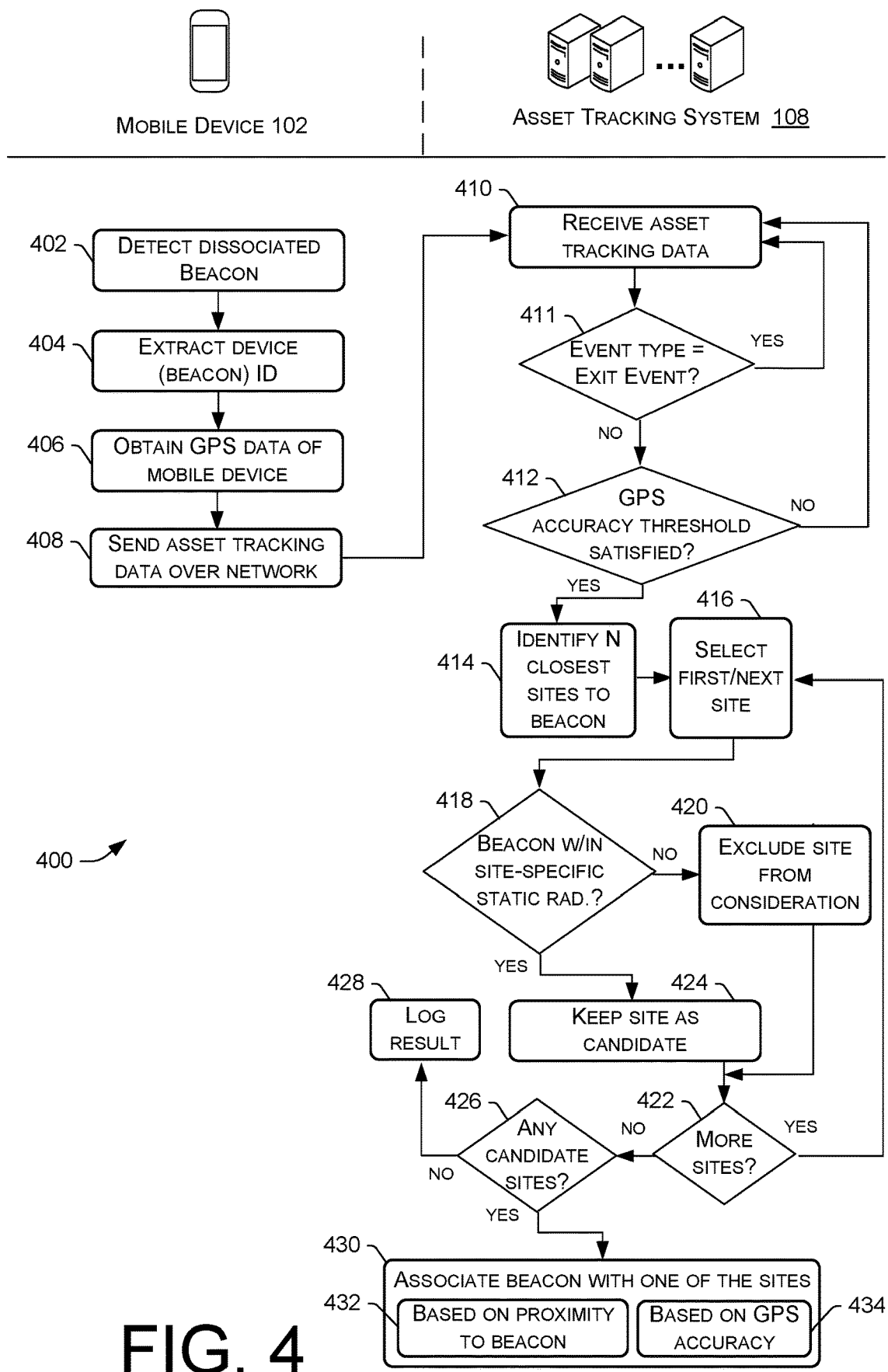
FIG. 4 illustrates a flowchart of an example process for associating a wireless beacon with a site using GPS data that includes a GPS location and an accuracy of the GPS location.

FIG. 4 illustrates a flowchart of an example process 400 for associating a wireless beacon 104 with a site 112 using GPS data 120 that includes a GPS location and an accuracy of the GPS location. The process 400 may be constituted of two independent sub-processes: one performed by a mobile device 102, and another performed by the asset tracking system 108, which were introduced in the previous figures. For discussion purposes, the process 400 is described with reference to the previous figures.

At 402, a mobile device 102 may detect a beacon 104 that is presently dissociated from a site 112. That is, the beacon data 114 may indicate that the beacon 104 has not yet been associated with a site, or has been associated with, and subsequently dissociated from, a site. This may be indicated by a NULL value, or similar data, in the beacon data 114 maintained by, and/or accessible to, the asset tracking system 108. The detection of the beacon 104 at block 402 may involve the mobile device 102 receiving and interpreting (using logic, such as a SDK, of the mobile device 102) one or more packets broadcasted by the beacon 104 and carrying data. The mobile device 102 may be within transmission range of (e.g., within a threshold distance from) the beacon 104 in order to detect the beacon 104 at block 402. In some embodiments, the logic of the mobile device 102 may be configured to "detect" beacons 104 when the mobile device 102 is brought within a predetermined distance (e.g., within 5 feet, ten feet, etc.) of the beacon 104 that is less than the transmission range of the beacon 104 (i.e., even if the transmission range exceeds this predetermined distance). Setting a predetermined distance for beacon discovery may enable better pinpointing the location of the beacon 104.

At 404, the mobile device 102 may extract a device ID 118 from the broadcasted packets of the detected beacon 104. This device ID 118 may take any suitable form, such as a media access control (MAC) address of the beacon 104, or some other unique ID of the beacon 104. As mentioned, a secure beacon broadcast can be used at block 404 to extract the device ID 118 of the beacon 104.

At 406, the mobile device 102 may obtain GPS data 120 of the mobile device 102. The GPS data 120 may be obtained at a various times relative to a time at which the mobile device 102 detected the beacon. For example, the GPS data 120 may, in some cases, be obtained by the mobile device 102 prior to detecting the beacon at block 402. The GPS data 120 can, however, be obtained at (or near) the time of detecting the beacon, or at a time after detecting the beacon at block 402. In some embodiments, the SDK of the mobile device 102 may cache GPS data 120 obtained by the operating system of the mobile device 102 for a predefined period of time, and then discard the GPS data 120 thereafter. In this manner, any GPS data that has been cached for the predefined period of time (e.g., 10 minutes) can be thrown out. This ensures that the GPS data 120 is relevant (in terms of proximity in time) to a detected beacon broadcast, and that stale GPS data 120 is thrown out. This also ensures that any GPS data 120 received by the asset tracking system 108 is not older than a threshold age (i.e., is not stale). The GPS data 120 may be obtained from the operating system of the mobile device 102 at block 406. The GPS data 120 may include, without limitation, location data 124 specifying a GPS location (e.g., expressed in terms of coordinates, such as latitude and longitude), accuracy data 126 specifying an accuracy of the GPS location, and similar data. In some embodiments, the accuracy data 126 may specify the accuracy of the GPS location as a distance metric (e.g., a number of meters, feet, etc.). The accuracy of the GPS location specified in the accuracy data 126 may indicate a maximum error of the reported GPS location.

At 408, the mobile device 102 may send asset tracking data 128 to the asset tracking system 108 over a computer network 110 (e.g., the Internet). The asset tracking data 128 may include at least the device ID 118 of the detected beacon, and the GPS data 120, which may include at least the location data 124 and the accuracy data 126. The asset tracking system 108 may be located at a geographically remote location with respect to the present location of the mobile device 102.

At 410, the asset tracking system 108 may receive, from the mobile device 102 over the computer network 110, the asset tracking data 128, which includes at least the device ID 118 of the detected beacon 104, and the GPS data 120, which may include at least the location data 124 and the accuracy data 126. The GPS data 120 may, in some embodiments, include an age of the GPS data 120, which may be in the form of a timestamp or some other time-based data that indicates a time when the GPS data 120 was obtained by the operating system of the mobile device 102. The time may be expressed as an absolute time or a relative time (e.g., relative to a time the mobile device 102 detected the beacon). This relative time metric can be calculated by the SDK of the mobile device 102, for example.

At 411, the asset tracking system 108 may determine whether an event type of the signal received from the mobile device 102 at block 410 is a particular type of event among multiple types of events. For example, the SDK of the mobile device 102 may be configured to collect or capture events whenever the operating system of the mobile device 102 detects a beacon broadcast. These events may be one of multiple types of events including, without limitation, an enter event, an idle event, and an exit event. An enter event occurs in response to the operating system of the mobile device first discovering a beacon, or first discovering a beacon after an exit event has occurred for that beacon. For example, if a user carrying the mobile device 102 enters a store and carries the mobile device 102 near a beacon 104 in that store, an enter event may occur upon the mobile device 102 discovering the beacon via a beacon broadcast. The mobile device 102 may notify the asset tracking system 108 that this event has occurred by sending data regarding this event over the network 110 to the asset tracking system 108. The operating system of the mobile device 102 may or may not capture GPS data with an enter event. However, if and when the asset tracking system 108 does receive GPS data 120 along with the enter event notification, this type of event may indicate that the GPS data 120 is reliable. This is because the asset tracking system 108 can deduce that the mobile device 102 is actually near the beacon 104 when an enter event occurs. As such, GPS data 120 associated with an enter event can be trusted. An idle event may occur after the occurrence of an enter event, so long as the mobile device 102 is still within range of the beacon 104. If and when the asset tracking system 108 receives GPS data 120 along with an idle event notification, this type of event may also indicate that the GPS data 120 is reliable. However, GPS data 120 received along with an exit event may not be reliable. For instance, an exit event may occur after the occurrence of an enter event, and after a period of time (e.g., 30 seconds, 1 minute, etc.) has lapsed without the mobile device 102 detecting another beacon broadcast from the beacon. An exit event might occur after the user has already left a site, and as such, it is not a reliable signal for purposes of determining the geolocation of the beacon 104. Accordingly, at block 411, a determination can be made as to whether an event type of the signal received from the mobile device 102 along with the asset tracking data 128 is a particular type of event; namely, whether the event is an exit event. If the event is an exit event, the process 400 may follow the "YES" route from block 411 to block 410, where the asset tracking system 108 refrains from associating the detected beacon 104 with any site due to the unreliability of the GPS data 120 received at block 410. If the event is not an exit event, but is instead an enter event or an idle event, the process 400 may follow the "NO" route from block 411 to block 412.

At 412, the asset tracking system 108 may determine whether the accuracy of the GPS location specified in the accuracy data 126 satisfies an accuracy threshold. For example, the determination at block 412 may include determining whether a distance specified in the accuracy data 126 is less than a threshold distance. For example, the accuracy data 126 may specify the accuracy of the GPS location as a distance of 250 meters, and the accuracy threshold may be expressed as a threshold distance of 200 meters. In this example, the accuracy threshold is not satisfied, and the process 400 may follow the "NO" route from block 412 to block 410, where the asset tracking system 108 awaits additional asset tracking data 128 from the same mobile device 102 or from a different mobile device 102. In other words, the asset tracking system 108 refrains from associating the detected beacon 104 with any site due to the accuracy threshold not being satisfied. However, if the accuracy threshold is satisfied at block 412 (e.g., an accuracy of the GPS location specified as a distance of 150 meters, with an accuracy threshold specified as a threshold distance of 200 meters), the process 400 may follow the "YES" route from block 412 to block 414. In addition to a distance accuracy metric, the GPS accuracy evaluation at block 412 may utilize the aforementioned age of the GPS data 120, if the GPS data 120 includes the age of the GPS data. For example, if the GPS data 120 is older than a threshold age (e.g., if the GPS data 120 was obtained by the operating system of the mobile device 102 more than a threshold amount of time before the time when the beacon was detected by the mobile device 102, or more than a threshold amount of time before the asset tracking data 128 was received by the asset tracking system 108 at block 410, etc.), the GPS data 120 may be considered to be too inaccurate, and the process 400 may follow the "NO" route from block 412 to block 410. Otherwise, if the GPS data 120 satisfies an age threshold (e.g., if the GPS data 120 is not too old), the process 400 may follow the "YES" route from block 412 to block 414. Said another way, if the age of the GPS data satisfies an age threshold, the algorithm may continue to block 414, otherwise, if the age of the GPS data does not satisfy the age threshold in that the GPS data is considered too old to be useful, the algorithm may refrain from associating the beacon with a site.

At 414, the asset tracking system 108 may identify a set of N identified sites 112, among a plurality of sites maintained in a data store (e.g., the master site data 116) accessible to the asset tracking system 108. This set of N identified sites may be identified as a predetermined number, N, of the plurality of sites that are closest to the GPS location specified in the location data 124. The N closest sites may be determined based on respective distances between the GPS location specified in the location data 124 and respective centroid coordinates 304 of the plurality of sites 112. It is also to be appreciated that the identification of the N closest sites is an optional step that may make running the algorithm at the asset tracking system 108 more efficient by excluding from consideration a potentially large number of farther away sites. For example, the master site data 116 may maintain data regarding thousands, hundreds of thousands, or even millions of sites 112. Evaluating every site may be computationally-intensive and a waste of resources when a subset of the closest sites can be considered. The value of N can be chosen as a smaller value to improve the efficiency of the system 108, while a larger value of N can improve the accuracy of the end result. In some embodiments, other filtering criteria can be used to select from sites to evaluate from a superset of sites 112 that are maintained in the master site data 116. For example, the asset tracking system 108 may initially filter the sites based on whether they are associated with a merchant identifier (ID) that is also associated with the detected beacon 104, and then select the N closest sites from the sites associated with the common merchant ID. For instance, the beacon 104 may be associated with a specific division or campaign (e.g., a promotional campaign), and the master site data 116 may indicate which sites are also associated with that same campaign. A "merchant ID" or a similar identifier can be used for associating beacons and sites with a division or campaign, the name "merchant ID" being merely an example name given to this type of tag. Other filtering criteria can be used in a similar manner to refine the set of sites that should be considered for the beacon-to-site association.

At 416, a first site (e.g., of the N closest) may be selected for evaluation, and at 418, the asset tracking system 108 may determine whether a distance between the GPS location specified in the location data 124 and the centroid coordinates 304 of the selected site under evaluation is less than or equal to a static radius, R, assigned to the site 112. Examples of these static radii are shown in FIG. 1. Thus, if site 112(A) is selected at block 416, the asset tracking system 108 may determine, at block 418, whether a distance between the GPS location specified in the location data 124 and the centroid coordinates 304 of site 112(A) is less than or equal to the static radius, $R_A$, assigned to site 112(A). This amounts to a determination of whether the beacon 104 (detected by the mobile device 102) is within the static radius, R, of the site 112 being evaluated. If the GPS location is not within the static radius, R, assigned to the site 112, the process 400 may follow the "NO" route from block 418 to block 420, where the site 112 may be excluded from consideration based on the distance between the GPS location and the centroid coordinates 304 of the site 112 being greater than the static radius, R, assigned to the site 112.

At 422, a determination is made as to whether there are more sites (e.g., of the N closest) to evaluate. If there are more sites to evaluate, the process 400 may follow the "YES" route from block 422 back to block 416 where the next site is selected for evaluation, and the determination at block 418 iterates for that site. If, at block 418, it is determined that a distance between the GPS location specified in the location data 124 (which represents an approximate location of the beacon 104) and the centroid coordinates 304 of a site under evaluation is less than or equal to the static radius, R, assigned to the site, the process 400 may follow the "YES" route from block 418 to block 424, where the site is kept as a qualifying candidate for further consideration. Again, at block 422, if there are more sites to evaluate, the process 400 may follow the "YES" route from block 422 back to block 416 where the next site is selected for evaluation, and the determination at block 418 iterates for that site. As soon as there are no more sites to evaluate, as determined at block 422, the process 400 may follow the "NO" route from block 422 to block 426.

At 426, a determination is made as to whether there are any qualifying candidate sites whose centroids 304 are closer to the GPS location specified in the location data 124 than the respective static radii assigned to those sites. If there are no qualifying sites, meaning that the GPS location specified in the location data 124 was not within the static radius for any of the closest N sites, the process 400 may follow the "NO" route from block 426 to block 428, where the outcome/result of the evaluation is logged as a failure to associate the beacon with a site. This logged data can be used to select beacons 104 that have been detected by mobile devices 102, but that have not been associated with sites to determine if a different algorithm will override this determination to keep the beacon dissociated. That is, if the result/outcome of the process 400 is to refrain from associating the beacon 104 with a site, another algorithm (described with reference to the following figures) may be used to determine whether to associate the beacon 104 with the site, notwithstanding this result/outcome of the process 400.

At 426, if there is at least one qualifying candidate site 112, the process 400 may follow the "YES" route from block 426 to block 430, where the asset tracking system 108 may associate the wireless beacon 104 with a qualifying site 112 based at least in part on the distance between the GPS location specified in the location data 124 and the centroid coordinates 304 of the site 112 being less than or equal to the static radius, R, assigned to the site 112. If there is a single qualifying site at block 426, that beacon 104 may be associated with the single qualifying site at block 430. If there are multiple qualifying sites 112 at block 426, a selection algorithm may select one of the qualifying sites based on proximity of the site 112 to the GPS location (and hence, the beacon 104), as shown by sub-block 432. For example, at sub-block 432, the asset tracking system 108 may determine that a second distance between the GPS location and the centroid coordinates 304 of a second site 112(B) is less than a second a first distance between the GPS location and the centroid coordinates 304 of a first site 112(A), and, as a result, the beacon 104 may be associated with the closer, second site 112(B). In some embodiments, the selection algorithm may select one of the qualifying sites based on the GPS accuracy, as shown by sub-block 434. For example, as mentioned, each site may be assigned a static accuracy distance threshold. This is a site-specific GPS accuracy threshold specified as a distance, and it may be used in the selection algorithm. In an illustrative example, the first site 112(A) may be assigned a first static accuracy distance threshold of 200 meters because the first site 112(A) may be large in size (e.g., a large department store), while the second site 112(B) may be assigned a second static accuracy distance threshold of 30 meters because the second site 112(B) may be small in size (e.g., a small convenience store) and because the second site 112(B) is close to the first site 112(A) in terms of the distance between the sites. In this case, the selection algorithm might filter out candidate sites if the GPS accuracy is greater than that site's static accuracy distance threshold. Continuing with the previous example, if the distance specified in the GPS accuracy data 126 is 150 meters, this distance may be compared to each static accuracy distance threshold for each candidate site, and, since 150 meters is greater than 30 meters (which is the static accuracy distance threshold assigned to the smaller, second site 112(B)), the second site 112(B) may be excluded from consideration as a site with which the beacon 104 is to be associated. Meanwhile, because 150 meters is less than 200 meters (which is the static accuracy distance threshold assigned to the larger, first site 112(A)), the first site 112(A) is kept as a candidate site. If multiple candidate sites remain, the closer site to the GPS location may be selected as the site to which the beacon 104 is associated. In practice, this means that the following situation may occur).

Figure 5:
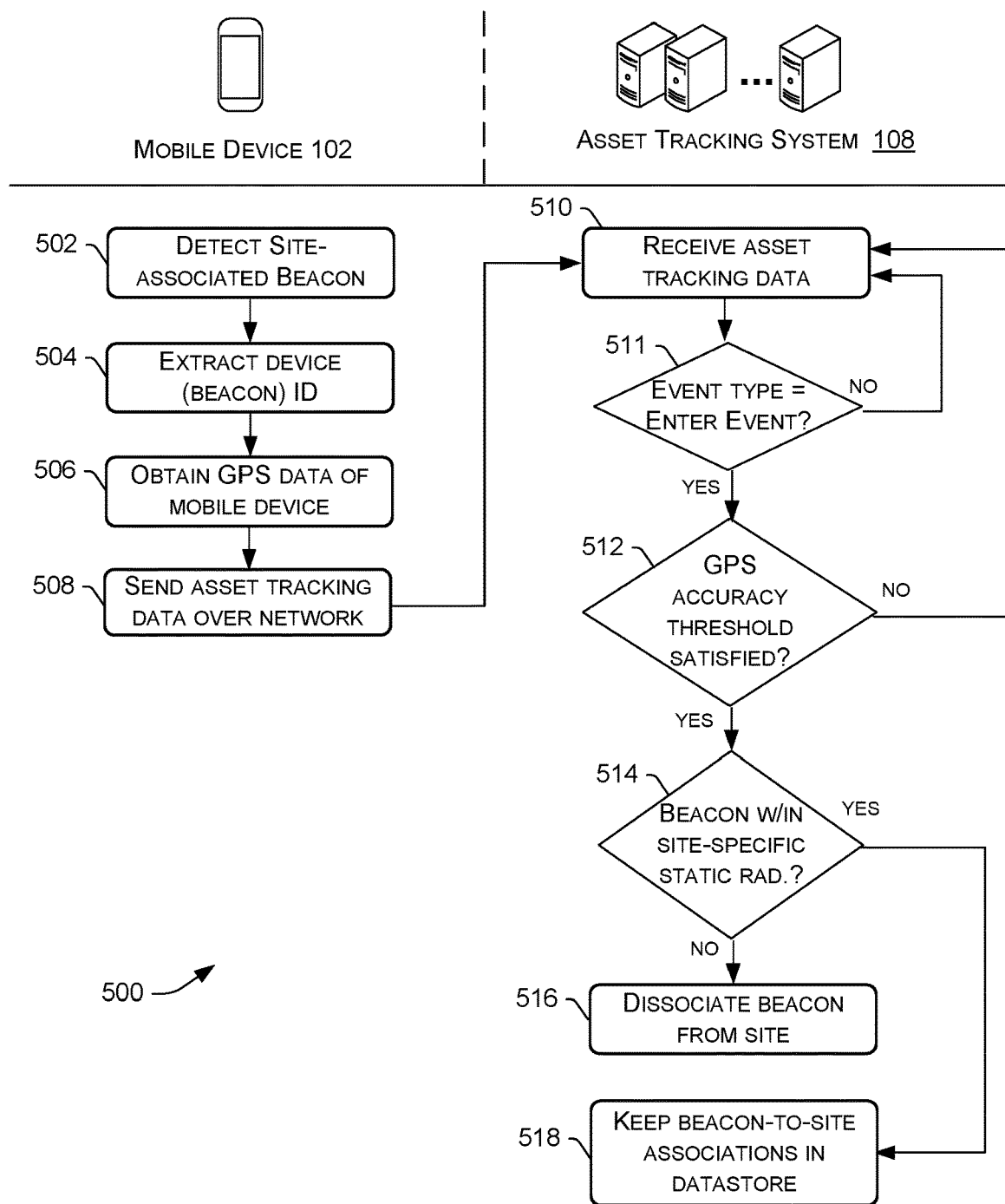
FIG. 5 illustrates a flowchart of an example process for dissociating a wireless beacon from a site using GPS data that includes a GPS location and an accuracy of the GPS location.
Figure 8:
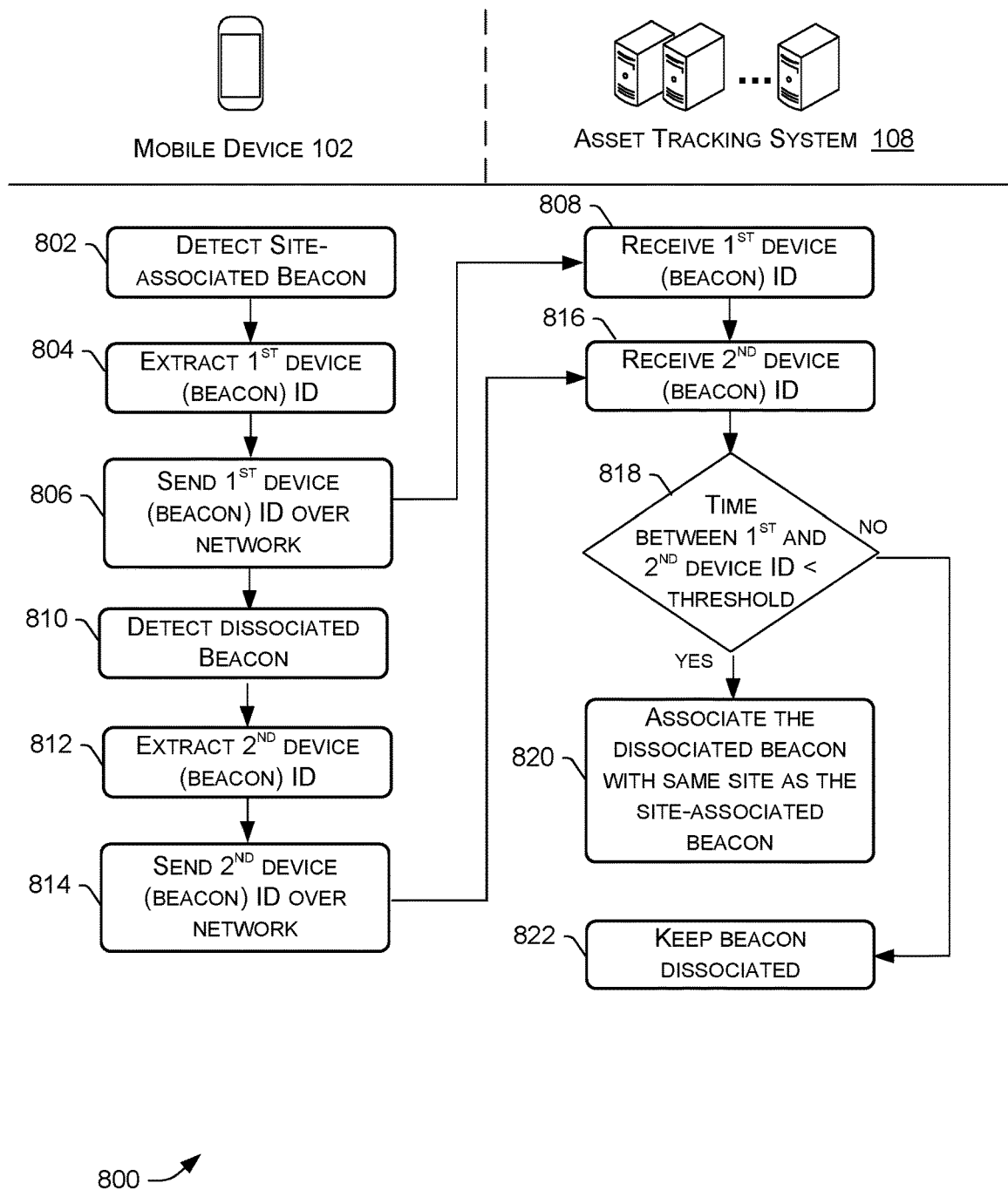
FIG. 8 illustrates a flowchart of an example process for associating a wireless beacon with a site using a secondary beacon as an anchor.
Figure 9:
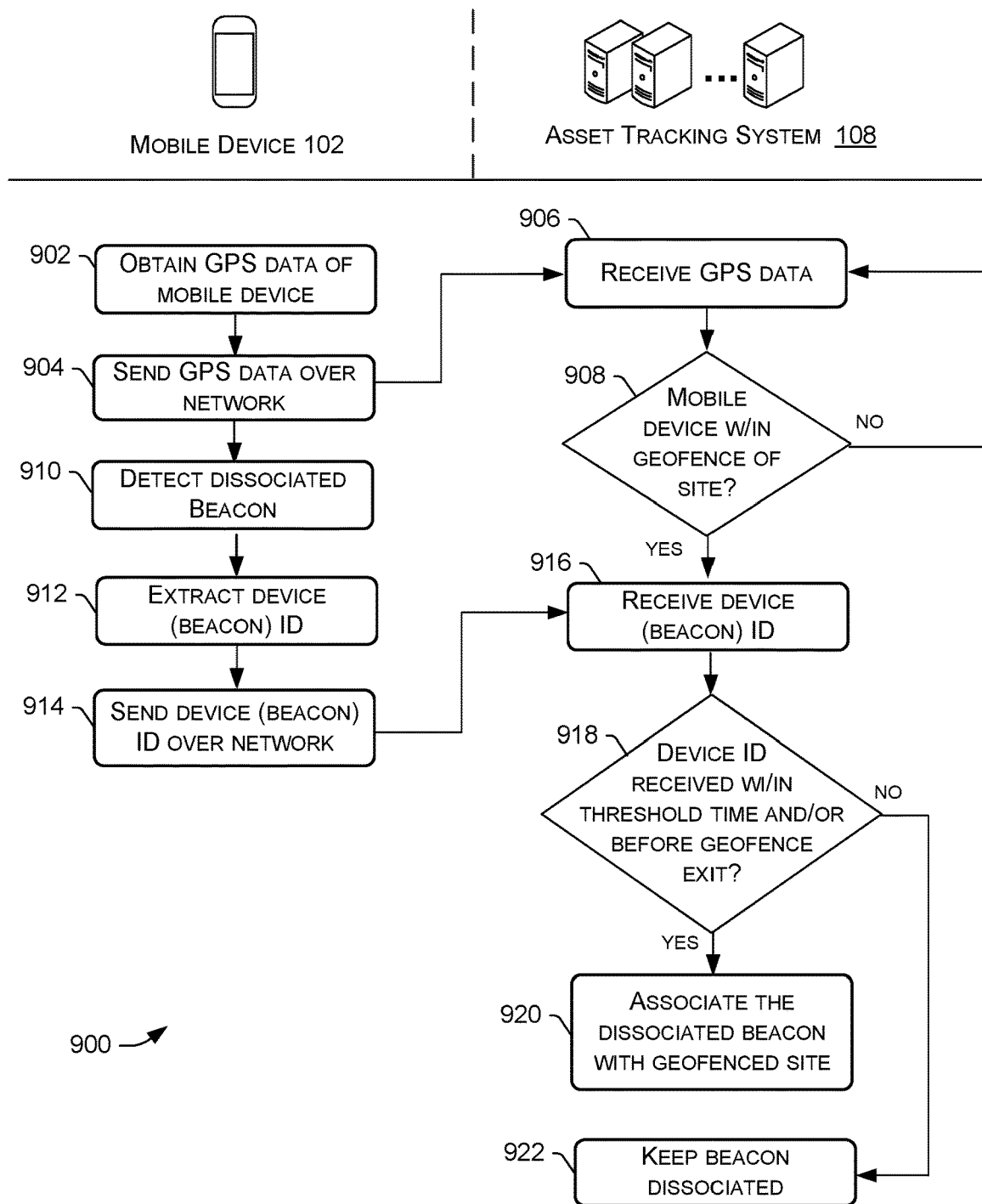
FIG. 9 illustrates a flowchart of an example process for associating a wireless beacon with a site using a geofence around a site as an anchor.

FIG. 5 illustrates a flowchart of an example process 500 for dissociating a wireless beacon 104 from a site using GPS data 120 that includes a GPS location and an accuracy of the GPS location. The process 500 may be constituted of two independent sub-processes: one performed by a mobile device 102, and another performed by the asset tracking system 108, which were introduced in the previous figures. For discussion purposes, the process 500 is described with reference to the previous figures. It is to be appreciated that the process 500 may be executed with respect to a site-associated beacon 104 that has already been associated with a site 112 using, for example, the process 400 of FIG. 4, and/or the process 800 of FIG. 8, and/or the process 900 of FIG. 9 (FIGS. 8 and 9 are described in detail below). In other words, a beacon 104 may be dissociated from a site 112 using the process 500 after the beacon 104 has already been associated with the site 112 using any single or combination of the processes described herein for associating beacons with sites.

Blocks 502-510 may include similar operations to those discussed above with respect to blocks 402-410 of the process 400. For the sake of brevity, these operations will not be described with respect to blocks 502-510, as blocks 402-410 can be referenced. A difference between the beacon of FIG. 4 and the beacon of FIG. 5, however, is that the beacon detected at block 502 is presently associated with a site 112 (referred to as a "site-associated" beacon). Thus, the asset tracking system 108 is configured to determine whether to dissociate the beacon 104 from the site 112 using the process 500.

At 511, the asset tracking system 108 may determine whether an event type of the signal received from the mobile device 102 at block 510 is a particular type of event among multiple types of events. Again, as described above with reference to FIG. 4, these events may be one of multiple types of events including, without limitation, an enter event, an idle event, and an exit event. Accordingly, at block 511, a determination can be made as to whether an event type of the signal received from the mobile device 102 along with the asset tracking data 128 is a particular type of event; namely, whether the event is an enter event. If the event is not an enter event, but is instead an idle event or an exit event, the process 500 may follow the "NO" route from block 511 to block 510, where the asset tracking system 108 awaits additional asset tracking data 128 from the same mobile device 102 or from a different mobile device 102. In other words, the asset tracking system 108 refrains from dissociating the detected beacon 104 from the site 112 with which it is presently associated. This is due to the unreliability of the GPS data 120 received at block 510. Notably, the reliability is held to a higher standard in FIG. 5 for dissociating a beacon from a site than the standard that is used in FIG. 4 for associating a beacon with a site. That is, both exit events and idle events are considered too unreliable for dissociating a beacon from a site based on GPS data received at block 510. If the event, at block 511, is an enter event, the process 500 may follow the "YES" route from block 511 to block 512.

At 512, the asset tracking system 108 may determine whether the accuracy of the GPS location specified in the accuracy data 126 (received in the asset tracking data at block 510) satisfies an accuracy threshold. For example, the determination at block 512 may include determining whether a distance specified in the accuracy data 126 is less than or equal to the threshold distance. For example, the accuracy data 126 may specify the accuracy of the GPS location as a distance of 250 meters, and the accuracy threshold may be expressed as a threshold distance of 200 meters, in which case the accuracy threshold is not satisfied. In some embodiments, the determination at block 512 may include determining whether a distance specified in the accuracy data 126 is less than or equal to the static radius, R, assigned to the site. If the accuracy threshold is not satisfied at block 512, the process 500 may follow the "NO" route from block 512 to block 510, where the asset tracking system 108 awaits additional asset tracking data 128 from the same mobile device 102 or from a different mobile device 102. In other words, the asset tracking system 108 refrains from dissociating the detected beacon 104 from the site 112 with which it is presently associated due to the accuracy threshold not being satisfied. However, if the accuracy threshold is satisfied at block 512, the process 500 may follow the "YES" route from block 512 to block 514.

At 514, the asset tracking system 108 may determine whether a distance between the GPS location specified in the location data 124 (received in the asset tracking data at block 510) and the centroid coordinates 304 of the site 112 (with which the beacon 104 is presently associated) is less than or equal to a static radius, R, assigned to the site 112. If this distance between the GPS location and the centroid coordinates 304 of the site 112 is greater than the static radius, R, assigned to the site 112, the process 500 may follow the "NO" route from block 514 to block 516, where the asset tracking system 108 may dissociate the wireless beacon 104 from the site 112 with which it is presently associated. In other words, if the beacon 104 is located outside of the static radius, R, of the site 112 with which it is presently associated, this is taken as an indication that the beacon 104 is no longer located at that site 112, and the beacon 104 may be "decommissioned" by removing the association of the beacon 104 and the site 112 within the beacon data 114 and/or within the master site data 116.

If, at block 514, it is determined that the beacon is still located within the static radius, R, assigned to its presently associated site 112, the process 500 may follow the "YES" route from block 514 to block 518, where the beacon-to-site association is kept intact in the datastore (e.g., in the beacon data 114 and/or the master site data 116). In other words, if the beacon 104 is located within the static radius, R, of the site 112 with which it is presently associated, this is taken as an indication that the beacon 104 is still located at that site 112, and the beacon 104 may remain associated with the site 112 by maintaining the association data between the beacon 104 and the site 112 within the beacon data 114 and/or within the master site data 116.

Figure 6:
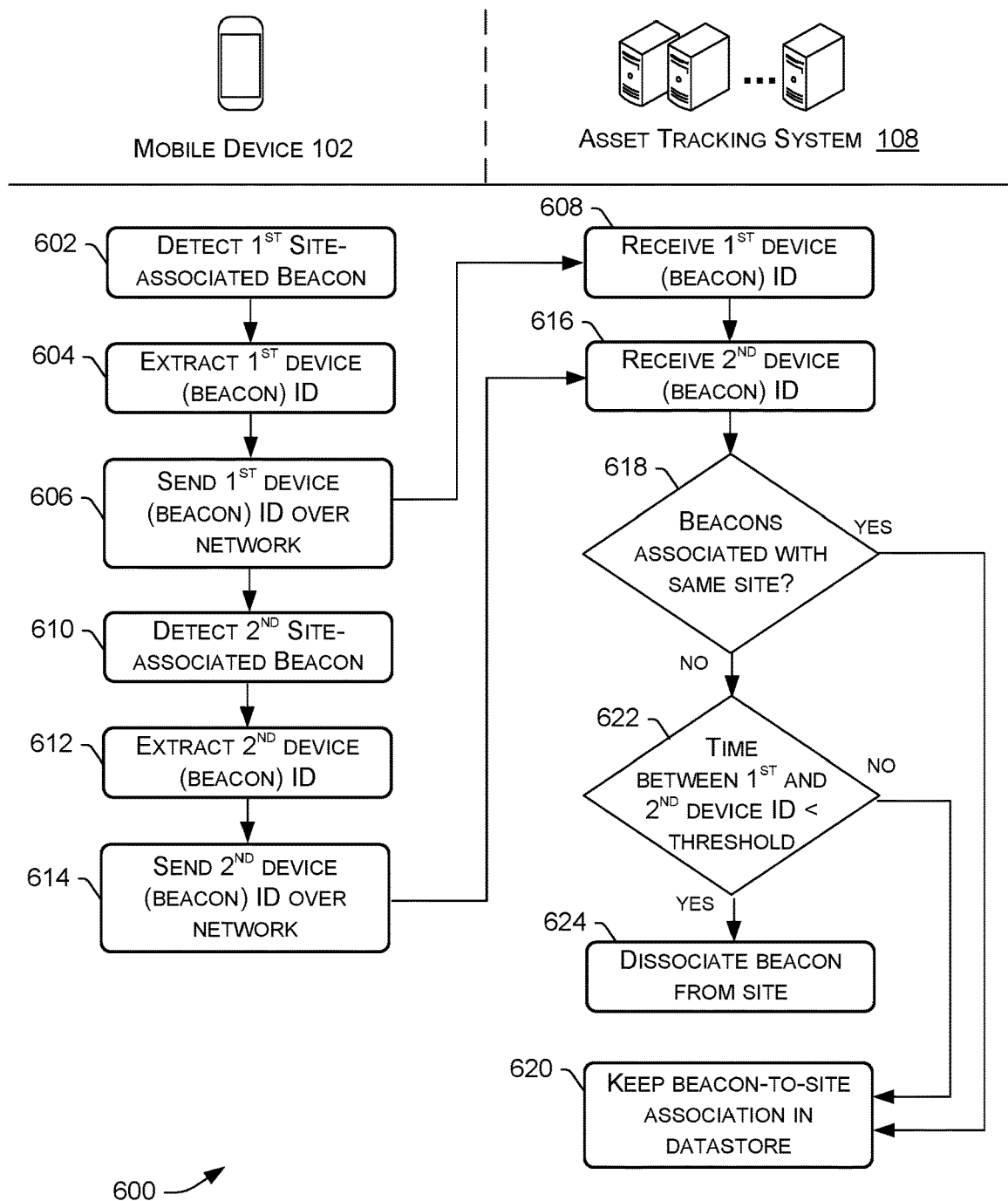
FIG. 6 illustrates a flowchart of an example process for dissociating a wireless beacon from a site based on the receipt of two separate device (beacon) IDs within a threshold amount of time.

FIG. 6 illustrates a flowchart of an example process 600 for dissociating a wireless beacon 104 from a site based on the receipt of two separate device (beacon) IDs 118 within a threshold amount of time. The process 600 may be constituted of two independent sub-processes: one performed by a mobile device 102, and another performed by the asset tracking system 108, which were introduced in the previous figures. For discussion purposes, the process 600 is described with reference to the previous figures. It is to be appreciated that the process 600 may be executed with respect to a site-associated beacon 104 that has already been associated with a site 112 using, for example, the process 400 of FIG. 4, and/or the process 800 of FIG. 8, and/or the process 900 of FIG. 9 (FIGS. 8 and 9 are described in detail below). In other words, a beacon 104 may be dissociated from a site 112 using the process 600 after the beacon 104 has already been associated with the site 112 using any single or combination of the processes described herein for associating beacons with sites.

At 602, a mobile device 102 may detect a first beacon 104(1) that is presently associated with a site 112. That is, the beacon data 114 may indicate that the beacon 104(1) was previously, and still is, associated with a site 112. Again, the detection of the first beacon 104(1) at block 602 may involve the mobile device 102 receiving and interpreting (using logic, such as a SDK, of the mobile device 102) one or more packets broadcasted by the beacon 104(1) and carrying data. The mobile device 102 may be within transmission range of (e.g., within a threshold distance from) the beacon 104(1) in order to detect the beacon 104(1) at block 602. In some embodiments, the logic of the mobile device 102 may be configured to "detect" beacons 104 when the mobile device 102 is brought within a predetermined distance (e.g., within 5 feet, ten feet, etc.) of the beacon 104 that is less than the transmission range of the beacon 104 (i.e., even if the transmission range exceeds this predetermined distance).

At 604, the mobile device 102 may extract a device ID 118 from the broadcasted packets of the detected first beacon 104(1). This device ID 118 may take any suitable form, such as a MAC address of the beacon 104(1), or some other unique ID of the beacon 104(1). As mentioned, a secure beacon broadcast can be used at block 604 to extract the device ID 118 of the beacon 104(1).

At 606, the mobile device 102 may send the device ID 118 of the first beacon 104(1) (which was extracted at block 604) to the asset tracking system 108 over a computer network 110 (e.g., the Internet). The mobile device 102 may, in some embodiments, send additional asset tracking data 128, such as the GPS data 120, to the asset tracking system 108 at block 606.

At 608, the asset tracking system 108 may receive, from the mobile device 102 over the computer network 110, the device ID 118 of the first beacon 104(1). The asset tracking system 108 may, in some embodiments, receive additional asset tracking data 128, such as the GPS data 120, from the mobile device 102 at block 608.

At 610, the mobile device 102 may detect a second beacon 104(2) that is presently associated with a site 112 (e.g., the same site with which the first beacon 104(1) is associated, or a different site). That is, the beacon data 114 may indicate that the beacon 104(2) was previously, and still is, associated with a site 112. Again, the detection of the second beacon 104(2) at block 610 may involve the mobile device 102 receiving and interpreting (using logic, such as a SDK, of the mobile device 102) one or more packets broadcasted by the beacon 104(2) and carrying data. The mobile device 102 may be within transmission range of (e.g., within a threshold distance from) the beacon 104(2) in order to detect the beacon 104(2) at block 610. FIG. 3 illustrates an example where the mobile device 102 may first detect the first beacon 104(1) at block 602, and subsequently detect the second beacon 104(2) at block 610, as the user 300 traverses the path 302.

At 612, the mobile device 102 may extract a device ID 118 from the broadcasted packets of the detected second beacon 104(2). This device ID 118 may take any suitable form, such as a MAC address of the beacon 104(2), or some other unique ID of the beacon 104(2). As mentioned, a secure beacon broadcast can be used at block 612 to extract the device ID 118 of the beacon 104(2).

At 614, the mobile device 102 may send the device ID 118 of the second beacon 104(2) (which was extracted at block 612) to the asset tracking system 108 over a computer network 110 (e.g., the Internet). The mobile device 102 may, in some embodiments, send additional asset tracking data 128, such as the GPS data 120, to the asset tracking system 108 at block 614.

At 616, the asset tracking system 108 may receive, from the mobile device 102 over the computer network 110, the device ID 118 of the second beacon 104(2). The asset tracking system 108 may, in some embodiments, receive additional asset tracking data 128, such as the GPS data 120, from the mobile device 102 at block 616.

At 618, the asset tracking system 108 may determine whether the two detected beacons 104(1) and 104(2) are associated with the same site 112. The asset tracking system 108 may access the beacon data 114 to make this determination. If the two beacons 104(1) and 104(2) are associated with the same site 112, the process 600 may follow the "YES" route from block 618 to block 620, where the beacon-to-site associations are kept intact in the datastore (e.g., in the beacon data 114 and/or the master site data 116). In other words, two beacons are detected by a single mobile device 102, and they are associated with the same site 112, they are not considered for dissociating either beacon 104 from the site 112. If the two beacons 104(1) and 104(2) are associated with different sites, the process 600 may follow the "NO" route from block 618 to block 622.

At 622, the asset tracking system 108 determines whether a time between detecting or receiving the device ID 118 of the first beacon 104(1) and detecting or receiving the device ID 118 of the second beacon 104(2) is less than a threshold amount of time. The two device IDs 118 may be sent at blocks 606 and 614, respectively, along with timestamps indicating respective times when the beacons 104(1) and 104(2) were detected by the mobile device 102. In addition, or alternatively, the asset tracking system 108 may look at the respective times that it received the two device IDs 118 at blocks 608 and 616, respectively. In any case, the time difference between two respective events associated with the detection of each beacon can be compared to the threshold amount of time at block 622. If the time difference is less than the threshold amount of time at block 622, the process 600 may follow the "YES" route from block 622 to block 624, where the asset tracking system 108 may dissociate one of the wireless beacons 104(1) from its presently associated site 112. In other words, if a user 300 carries a mobile device 102 along path 302 of FIG. 3, first bringing the mobile device 102 near the first beacon 104(1) associated with a first site 112, and then brining the mobile device 102 near the second beacon 104(2) within a threshold amount of time, and if the two beacons 104(1) and 104(2) are presently associated with different sites, this can be taken as an indication that at least one of the beacon-to-site associations in the beacon data 114 is incorrect, and, as a result, the first beacon 104(1) or the second beacon 104(2) may be "decommissioned" by removing the association of the beacon 104 and the site 112 within the beacon data 114 and/or within the master site data 116. Which beacon to dissociate may depend on the mobile data that has been received confirming or disconfirming the location of the individual beacons 104(1) and 104(2). For example, if a high number of mobile devices 102 have reported detecting the first beacon 104(1) at the site 112, and a low number of mobile devices 102 have reported detecting the second beacon 104(2) at a different site, the system 108 may have a higher confidence that the beacon-to-site association of the first beacon 104(1) is a high confidence determination, and, as a result, the system 108 may choose to dissociate the second beacon 104(2) from its presently associated site 112. Other confidence indicators can be used to determine which beacon-to-site association is lower confidence than the other, such as temporal data (e.g., recency of the beacon-to-site association being stored in the datastore(s)).

If, at block 622, the time difference is greater than the threshold amount of time, the process 600 may follow the "NO" route from block 622 to block 620, where the beacon-to-site associations are kept intact in the datastore (e.g., in the beacon data 114 and/or the master site data 116). In other words, even if two beacons are detected by a single mobile device 102 and they are associated with different sites, if they are detected outside of (or beyond) a threshold amount of time from each other, they are not considered for dissociating either beacon 104 from the site 112.

Figure 7:
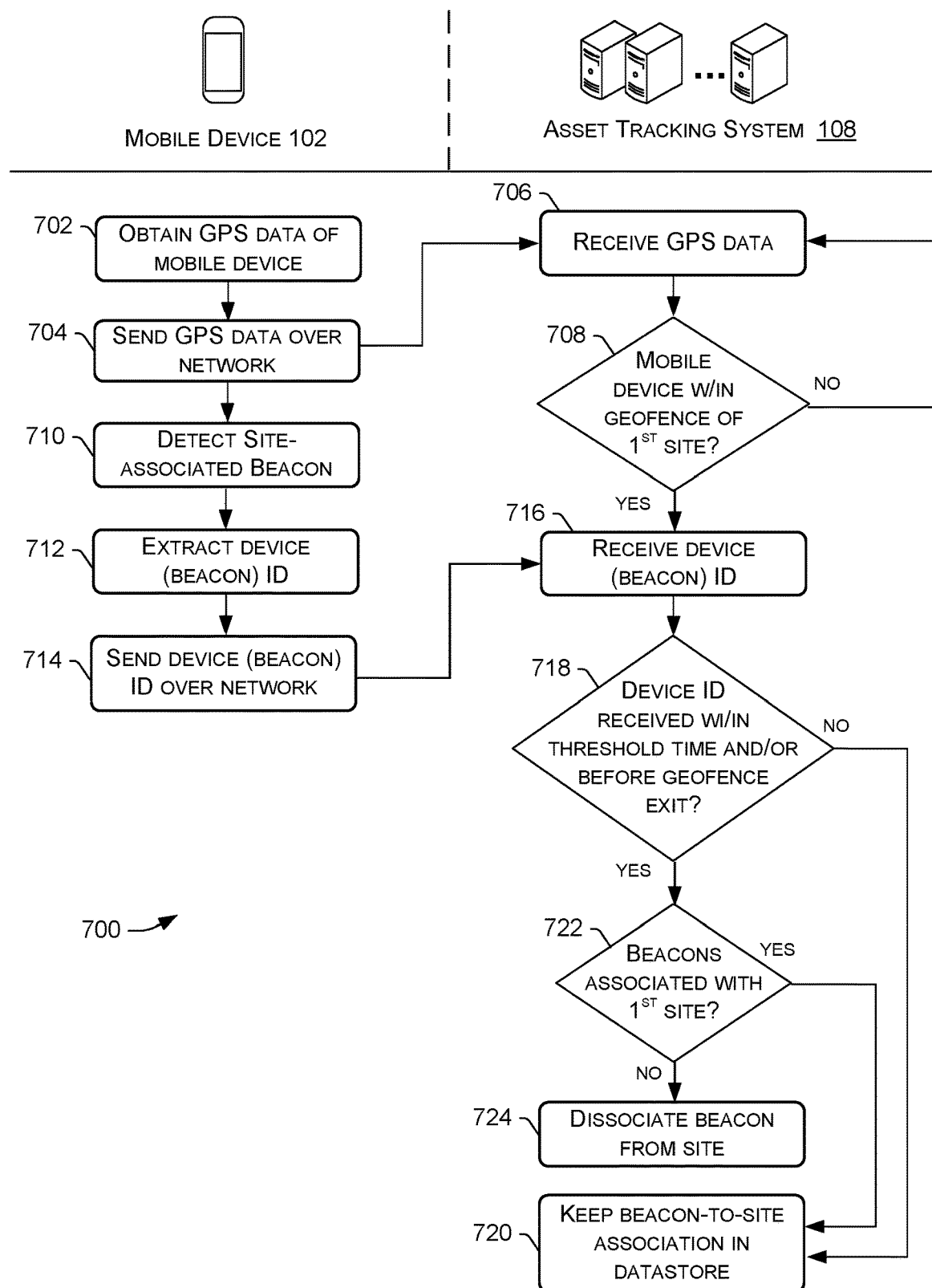
FIG. 7 illustrates a flowchart of an example process for dissociating a wireless beacon from a site using a geofence around a site.

FIG. 7 illustrates a flowchart of an example process 700 for dissociating a wireless beacon 104 from a site 112 using a geofence 308 around a site. The process 700 may be constituted of two independent sub-processes: one performed by a mobile device 102, and another performed by the asset tracking system 108, which were introduced in the previous figures. For discussion purposes, the process 700 is described with reference to the previous figures. It is to be appreciated that the process 700 may be executed with respect to a site-associated beacon 104 that has already been associated with a site 112 using, for example, the process 400 of FIG. 4, and/or the process 800 of FIG. 8, and/or the process 900 of FIG. 9 (FIGS. 8 and 9 are described in detail below). In other words, a beacon 104 may be dissociated from a site 112 using the process 700 after the beacon 104 has already been associated with the site 112 using any single or combination of the processes described herein for associating beacons with sites.

At 702, a mobile device 102 may obtain GPS data 120 of the mobile device 102. The GPS data 120 may be obtained at a time at or near which the mobile device 102 entered a geofence 308 surrounding a site 112. The GPS data 120 may be obtained from the operating system of the mobile device 102 at block 702. The GPS data 120 may include, without limitation, location data 124 specifying a GPS location (e.g., expressed in terms of coordinates, such as latitude and longitude). In some embodiments, the GPS data 120 obtained at block 702 includes accuracy data 126 specifying an accuracy of the GPS location, and similar data.

At 704, the mobile device 102 may send the GPS data 120 to the asset tracking system 108 over a computer network 110 (e.g., the Internet). The GPS data 120 may include at least the location data 124, and possibly accuracy data 126. The asset tracking system 108 may be located at a geographically remote location with respect to the present location of the mobile device 102.

At 706, the asset tracking system 108 may receive, from the mobile device 102 over the computer network 110, the GPS data 120, which includes at least the location data 124.

At 708, the asset tracking system 108 determine whether the GPS location specified in the location data 124 is within a geofence 308 surrounding the centroid coordinates 304 of a site 112 (e.g., a first site 112). If the GPS location is not located within the geofence 308 of a site, the process 700 may follow the "NO" route from block 708 to block 706 where the asset tracking system 108 awaits additional data. In other words, the asset tracking system 108 refrains from running the algorithm of FIG. 7 if a geofence entry event is not detected.

At 710, the mobile device 102 may detect a beacon 104 that is presently associated from a site 112. That is, the beacon data 114 may indicate that the beacon 104 was previously, and still is, associated with a site. The detection of the beacon 104 at block 710 may involve the mobile device 102 receiving and interpreting (using logic, such as a SDK, of the mobile device 102) one or more packets broadcasted by the beacon 104 and carrying data. The mobile device 102 may be within transmission range of (e.g., within a threshold distance from) the beacon 104 in order to detect the beacon 104 at block 710. In some embodiments, the logic of the mobile device 102 may be configured to "detect" beacons 104 when the mobile device 102 is brought within a predetermined distance (e.g., within 5 feet, ten feet, etc.) of the beacon 104 that is less than the transmission range of the beacon 104 (i.e., even if the transmission range exceeds this predetermined distance).

At 712, the mobile device 102 may extract a device ID 118 from the broadcasted packets of the detected beacon 104. This device ID 118 may take any suitable form, such as a MAC address of the beacon 104, or some other unique ID of the beacon 104. As mentioned, a secure beacon broadcast can be used at block 712 to extract the device ID 118 of the beacon 104.

At 714, the mobile device 102 may send the device ID 118 of the beacon 104 to the asset tracking system 108 over a computer network 110 (e.g., the Internet). The device ID 118 of the beacon 104 may be sent at block 714 along with additional asset tracking data 128, such as GPS data 120. The asset tracking system 108 may be located at a geographically remote location with respect to the present location of the mobile device 102

Returning with reference to block 708, if the asset tracking system 108 determines that the GPS location specified in the location data 124 is within the geofence 308 surrounding the centroid coordinates 304 of a site 112 (e.g., the first site 112), the process 700 may follow the "YES" route from block 708 to block 716, where, eventually, the asset tracking system 108 receives the device ID 118 of the beacon 104 from the mobile device 102.

At 718, the asset tracking system 108 may determine whether the device ID 118 was received at block 716 within a threshold amount of time since the determining that the GPS location was within the geofence 308 at block 708, or prior to receiving additional GPS data from the mobile device 102 specifying a GPS location outside of the geofence. In other words, the asset tracking system 108 determines whether, since the geofence entry event at block 708, whether the device ID 118 was received within a threshold amount of time, or before the mobile device 102 exits the geofence 308. If the device ID 118 of the beacon 104 is received after the threshold amount of time, or after the mobile device 102 exits the geofence 308, the process 700 may follow the "NO" route from block 718 to block 720, where the beacon-to-site association is kept intact in the datastore (e.g., in the beacon data 114 and/or the master site data 116). In other words, if the beacon 104 is detected by the mobile device too long after entering the geofence 308, or after the mobile device 102 exits the geofence 308, the beacon 104 may remain associated with the site 112 by maintaining the association data between the beacon 104 and the site 112 within the beacon data 114 and/or within the master site data 116. If the device ID 118 is received at block 716 within a threshold amount of time since the geofence entry event determined at block 708, or before the mobile device 102 exits the geofence 308, the process 700 may follow the "YES" route from block 718 to 722.

At 722, the asset tracking system 108 may determine whether the detected beacon 104 is presently associated with the same site (e.g., the first site 112) whose geofence 308 the mobile device 102 entered. If the beacon 104 is presently associated with the geofenced 308 site, the process 700 may follow the "YES" route from block 722 to block 720, where the beacon-to-site association is kept intact in the datastore (e.g., in the beacon data 114 and/or the master site data 116). In other words, if the beacon 104 is detected within a short time from the geofence 308 entry event, or before the mobile device 102 exits the geofence of the site 112 with which the beacon 104 is presently associated, this is taken as a validation of the current beacon-to-site association. If, on the other hand, the beacon is associated with a different site (e.g., a second site 112 that is not associated with the geofence 308 the mobile device 102 entered), the process 700 may follow the "NO" route from block 722 to block 724, where the asset tracking system 108 may dissociate the wireless beacon 104 from the site 112 with which it is presently associated. In other words, if the beacon 104 is detected within a short time from the geofence 308 entry event, or before the mobile device 102 exits the geofence of a site 112, but the beacon is presently associated with a different site, this is taken as an indication that the current beacon-to-site association is incorrect.

FIG. 8 illustrates a flowchart of an example process 800 for associating a wireless beacon 104 with a site 112 using a secondary beacon as an anchor. The process 800 may be constituted of two independent sub-processes: one performed by a mobile device 102, and another performed by the asset tracking system 108, which were introduced in the previous figures. For discussion purposes, the process 800 is described with reference to the previous figures.

Blocks 802-816 may include similar operations to those discussed above with respect to blocks 602-616 of the process 600. For the sake of brevity, these operations will not be described with respect to blocks 802-816, as blocks 602-616 can be referenced. A difference between FIG. 6 and FIG. 8, however, is that the first beacon 104(1) detected at block 802 is presently associated with a site 112 (referred to as a "site-associated" beacon), while the second beacon 104(2) detected at block 810 is not presently associated with any site (referred to as a "dissociated" beacon)—FIG. 6 describes detecting two site-associated beacons. Thus, the asset tracking system 108 is configured to determine whether to associate the second beacon 104(2) with a site 112 using the process 800. It is to be appreciated that the process 800 may be executed with respect to a dissociated (second) beacon 104(2) that has already been evaluated using the process 400 of FIG. 4 to confirm or disconfirm the result/outcome of the process 400 where the beacon 104(2) was associated with a site 112, or to override a result/outcome of the process 400 where the beacon 104(2) was not associated with a site 112. An example of the latter scenario is where the result/outcome of the process 400 was to refrain from associating the beacon 104(2) with a site, which result/outcome was logged at block 428 with respect to the beacon 104(2), and the process 800 is executed independently from the process 400, and if the result/outcome of the process 800 is to associate the beacon 104(2) with a site 112, the result/outcome of the process 800 may override (or trump) the result/outcome of the process 400. In other words, the second beacon 104(2) detected at block 810 may be a beacon that was previously detected by a mobile device 102 at an earlier point in time, and the result of the process 400 was a determination that the second beacon 104(2) should not be associated with a site 112.

At 818, after having received a device ID 118 of a first beacon 104(1) and a device ID 118 of a second beacon 104(2), the asset tracking system 108 may determine whether a time between detecting or receiving the device ID 118 of the first beacon 104(1) and detecting or receiving the device ID 118 of the second beacon 104(2) is less than a threshold amount of time. The two device IDs 118 may be sent at blocks 806 and 814, respectively, along with timestamps indicating respective times when the beacons 104(1) and 104(2) were detected by the mobile device 102. In addition, or alternatively, the asset tracking system 108 may look at the respective times that it received the two device IDs 118 at blocks 808 and 816, respectively. In any case, the time difference between two respective events associated with the detection of each beacon can be compared to the threshold amount of time at block 818. If the time difference is less than the threshold amount of time at block 818, the process 800 may follow the "YES" route from block 818 to block 820, where the asset tracking system 108 may associate the second wireless beacon 104(2) with the site 112 with which the first wireless beacon 104(1) is presently associated. In other words, if the first beacon 104(1) is known to be located at a site 112, and if the mobile device 102 detects the second beacon 104(2) within a threshold amount of time since detecting the first beacon 104(1), the known location of the first beacon 104(1) may be used to deduce that the second beacon 104(2) is also located at the same site 112. If, on the other hand, the time difference is greater than the threshold amount of time at block 818, the process 800 may follow the "NO" route from block 818 to block 822, where the second beacon 104(2) may remain dissociated from a site. In other words, if the time between detecting the first beacon 104(1) and the second beacon 104(2) with the same mobile device 102 exceeds some threshold amount of time, there is not enough certainty that the second beacon 104(2) is located at the same site 112 as the first beacon 104(1) (here, the "anchor" beacon), and the asset tracking system 108 chooses not to associate the second beacon 104(2) with a site.

FIG. 9 illustrates a flowchart of an example process 900 for associating a wireless beacon 104 with a site 112 using a geofence 308 around a site 112 as an anchor. The process 900 may be constituted of two independent sub-processes: one performed by a mobile device 102, and another performed by the asset tracking system 108, which were introduced in the previous figures. For discussion purposes, the process 900 is described with reference to the previous figures.

Blocks 902-916 may include similar operations to those discussed above with respect to blocks 702-716 of the process 700. For the sake of brevity, these operations will not be described with respect to blocks 902-916, as blocks 702-716 can be referenced. A difference between FIG. 7 and FIG. 9, however, is that the beacon 104 detected at block 910 is not presently associated with any site (referred to as a "dissociated" beacon), whereas the beacon 104 detected at block 710 of the process 700 is presently associated with a site (referred to as a "site-associated" beacon). Thus, the asset tracking system 108 is configured to determine whether to associate the beacon 104 detected at block 910 with a site 112 using the process 900. It is to be appreciated that the process 900 may be executed with respect to a dissociated beacon 104 that has already been evaluated using the process 400 of FIG. 4 to confirm or disconfirm the result/outcome of the process 400 where the beacon 104 was associated with a site 112, or to override a result/outcome of the process 400 where the beacon 104 was not associated with a site 112. An example of the latter scenario is where the result/outcome of the process 400 was to refrain from associating the beacon 104 with a site, which result/outcome was logged at block 428 with respect to the beacon 104, and the process 900 is executed independently from the process 400, and if the result/outcome of the process 900 is to associate the beacon 104 with a site 112, the result/outcome of the process 900 may override (or trump) the result/outcome of the process 400. In other words, the beacon 104 detected at block 910 may be a beacon that was previously detected by a mobile device 102 at an earlier point in time, and the result of the process 400 was a determination that the beacon 104 should not be associated with a site 112.

At 918, after having detected that a mobile device 102 entered a geofence 308 surrounding a site, and after having received, from the same mobile device 102, a device ID 118 of a beacon 104, the asset tracking system 108 may determine whether a time between determining that the mobile device 102 entered a geofence 308 of a site 112 and detecting or receiving the device ID 118 of the beacon 104 is less than a threshold amount of time or if the device ID 118 of the beacon 104 was received before a geofence exit event. If the time difference is less than the threshold amount of time at block 918 or if the beacon 104 is detected before the mobile device 102 exits the geofence 308, the process 900 may follow the "YES" route from block 918 to block 920, where the asset tracking system 108 may associate the wireless beacon 104 with the site 112 having the geofence 308 that the mobile device 102 entered. In other words, if the geofence 308 surrounds a known site 112, and if the mobile device 102 enters this geofence 308 and subsequently detects the beacon 104 within a threshold amount of time since entering the geofence 308 or before exiting the geofence 308, the geofence 308 entry event may be used to deduce that the beacon 104 is also located at the same site 112 that is surrounded by the geofence 308. If, on the other hand, the time difference is greater than the threshold amount of time at block 918 or if the beacon 104 is detected after the mobile device 102 exits the geofence 308, the process 900 may follow the "NO" route from block 918 to block 922, where the beacon 104 may remain dissociated from a site. In other words, if the time between the mobile device 102 entering the geofence 308 and the mobile device 102 detecting the beacon 104 exceeds some threshold amount of time or if the mobile device exits the geofence 308 before detecting the beacon 104, there is not enough certainty that the beacon 104 is located at the same site 112 surrounded by the geofence 308 (here, the "anchor" is a geofence), and the asset tracking system 108 chooses not to associate the beacon 104 with a site.

Figure 10:
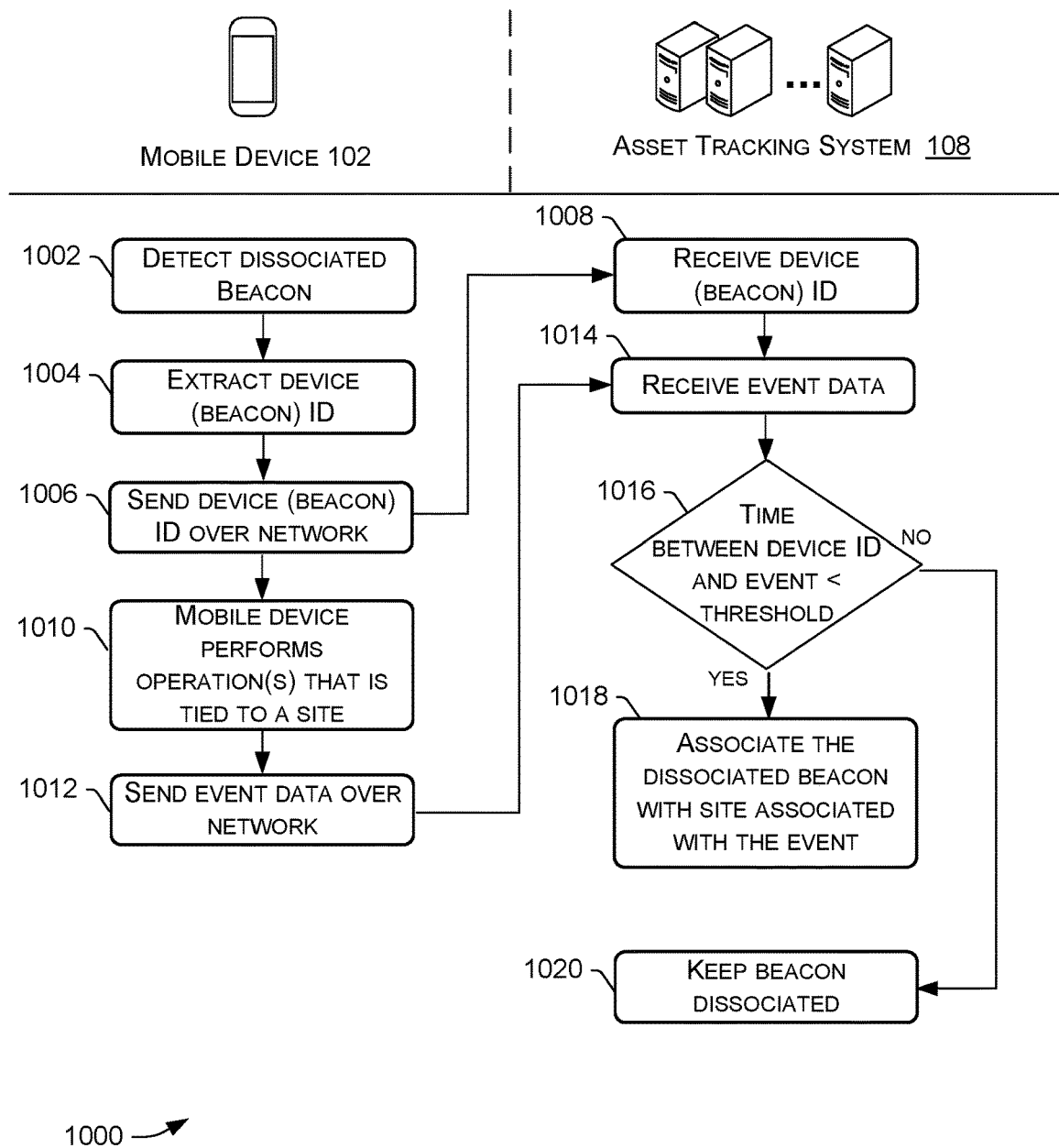
FIG. 10 illustrates a flowchart of an example process for associating a wireless beacon with a site based on an operation(s) of a mobile device that can be tied to a particular site.

FIG. 10 illustrates a flowchart of an example process 1000 for associating a wireless beacon 104 with a site based on an operation(s) of a mobile device 102 that can be tied to a particular site 112. The process 1000 may be constituted of two independent sub-processes: one performed by a mobile device 102, and another performed by the asset tracking system 108, which were introduced in the previous figures. For discussion purposes, the process 1000 is described with reference to the previous figures.

At 1002, a mobile device 102 may detect a beacon 104 that is presently dissociated from a site 112. That is, the beacon data 114 may indicate that the beacon 104 has not yet been associated with a site, or has been associated with, and subsequently dissociated from, a site. This may be indicated by a NULL value, or similar data, in the beacon data 114 maintained by, and/or accessible to, the asset tracking system 108. The detection of the beacon 104 at block 1002 may involve the mobile device 102 receiving and interpreting (using logic, such as a SDK, of the mobile device 102) one or more packets broadcasted by the beacon 104 and carrying data. The mobile device 102 may be within transmission range of (e.g., within a threshold distance from) the beacon 104 in order to detect the beacon 104 at block 1002. In some embodiments, the logic of the mobile device 102 may be configured to "detect" beacons 104 when the mobile device 102 is brought within a predetermined distance (e.g., within 5 feet, ten feet, etc.) of the beacon 104 that is less than the transmission range of the beacon 104 (i.e., even if the transmission range exceeds this predetermined distance).

At 1004, the mobile device 102 may extract a device ID 118 from the broadcasted packets of the detected beacon 104. This device ID 118 may take any suitable form, such as a MAC address of the beacon 104, or some other unique ID of the beacon 104. As mentioned, a secure beacon broadcast can be used at block 1004 to extract the device ID 118 of the beacon 104.

At 1006, the mobile device 102 may send the device ID 118 of the beacon 104 (which was extracted at block 1004) to the asset tracking system 108 over a computer network 110 (e.g., the Internet). The mobile device 102 may, in some embodiments, send additional asset tracking data 128, such as the GPS data 120, to the asset tracking system 108 at block 1006.

At 1008, the asset tracking system 108 may receive, from the mobile device 102 over the computer network 110, the device ID 118 of the beacon 104. In some embodiments, additional asset tracking data 128, such as the GPS data 120, may be received at block 1008.

At 1010, the mobile device 102 may perform an operation that is tied to a site 112 known to the asset tracking system 108. This operation may relate to a user logging into a website or a mobile application associated with the site, a user inputting data into a form that indicates the user is at a site, the mobile device 102 being used to make a payment for a product or service at the site, the mobile device 102 connecting to a local area network of the site, etc. In an illustrative example, an employee of a retail location may be tasked with walking around the site 112 to various assets 106 (e.g., product displays) and filling out a form using a mobile device 102 (e.g., a tablet computer) that includes fields confirming that the employee is at a specific site and that the employee has visually confirmed that the asset 106 is located at the site.

At 1012, in response to the operation(s) performed at block 1010, the mobile device 102 may send event data to the asset tracking system 108 over a computer network 110 (e.g., the Internet). This event data indicates that a mobile-driven event occurred at a specific site 112.

At 1014, the asset tracking system 108 may receive, from the mobile device 102 over the computer network 110, the event data. Accordingly, the asset tracking system 108 can deduce that the mobile device is presently located at a specific site 112 in response to receiving the event data at block 1014.

At 1016, after having received, from a mobile device 102, a device ID 118 of a beacon 104, and after having received the event data indicating that the mobile device 102 is located at a site 112, the asset tracking system 108 may determine whether a time between detecting or receiving the device ID 118 of the beacon 104 and detecting or receiving the event data is less than a threshold amount of time. If the time difference is less than the threshold amount of time at block 1016, the process 1000 may follow the "YES" route from block 1016 to block 1018, where the asset tracking system 108 may associate the wireless beacon 104 with the site 112 where the mobile device 102 is determined to be located based on the event data. In other words, if the mobile device 102 detects the beacon 104 within a threshold amount of time since the operation(s) are performed by the mobile device 102 at block 1010, the mobile-driven event from the operation(s) performed by the mobile device 102 at block 1010 may be used to deduce that the beacon 104 is also located at the same site 112 where the mobile device 102 is located. If, on the other hand, the time difference is greater than the threshold amount of time at block 1016, the process 1000 may follow the "NO" route from block 1016 to block 1020, where the beacon 104 may remain dissociated from a site. In other words, if the time between the mobile device 102 detecting the beacon 104 and the mobile device performing the operation(s) tied to the site at block 1010 exceeds some threshold amount of time, there is not enough certainty that the beacon 104 is located at the same site 112 as the mobile device 102 when the event data is sent and received at blocks 1012, and 1014, respectively.

Figure 11:
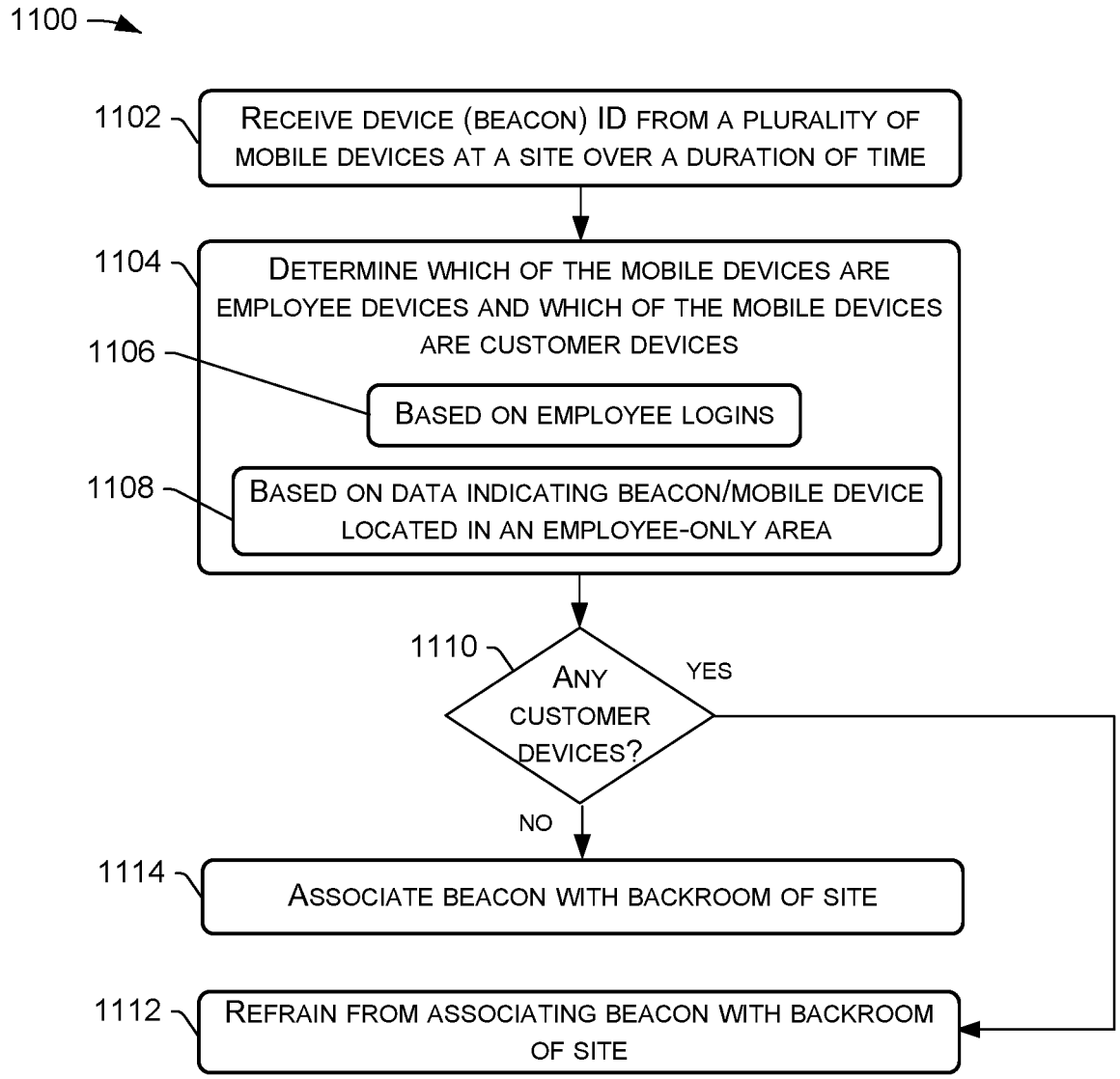
FIG. 11 illustrates a flowchart of an example process for associating a wireless beacon with a backroom or employee-only area within a site.

FIG. 11 illustrates a flowchart of an example process 1100 (implemented by the asset tracking system 108) for associating a wireless beacon 104 with a backroom or employee-only area within a site 112. For discussion purposes, the process 1100 is described with reference to the previous figures.

At 1102, the asset tracking system 108 may receive, over a duration of time from a plurality of mobile devices 102 over the computer network 110, a device ID that uniquely identifies a wireless beacon 104 that has been deployed in the field. The device ID may be received from these mobile devices 102 along with additional asset tracking data 128, such as GPS data 120.

At 1104, the asset tracking system may determine, among the mobile devices 102 that sent the device ID of the beacon 104, which of the mobile devices are employee devices used by employees who work at a site, and which of the mobile devices are customer devices. The determination at block 1104 may be based on employee logins to a website and/or to a mobile application executing on the mobile devices 102, as shown by sub-block 1106. The determination at block 1104 may additionally, or alternatively, be based on data received by the asset tracking system 108 that indicates the beacon 104 or the mobile devices 102 that detected the beacon is/are located in an employee-only area, such as a backroom of a retail site 112, as shown by sub-block 1108.

At 1110, based on the determination at block 1104, a determination is made as to whether there are any customer devices that detected the beacon 104. If so, the process 1100 may follow the "YES" route from block 1110 to block 1112, where the asset tracking system 108 may refrain from associating the beacon 104 with a backroom. Otherwise, if the asset tracking system 108 received device IDs over the duration of time exclusively from employee devices, the process 1100 may follow the "NO" route from block 1110 to block 1114, where the asset tracking system 108 may associate the beacon 104 with a backroom of a site 112 with which the beacon is presently associated (e.g., as determined from the process 400, and/or the process 800, and/or the process 900).

Figure 12:
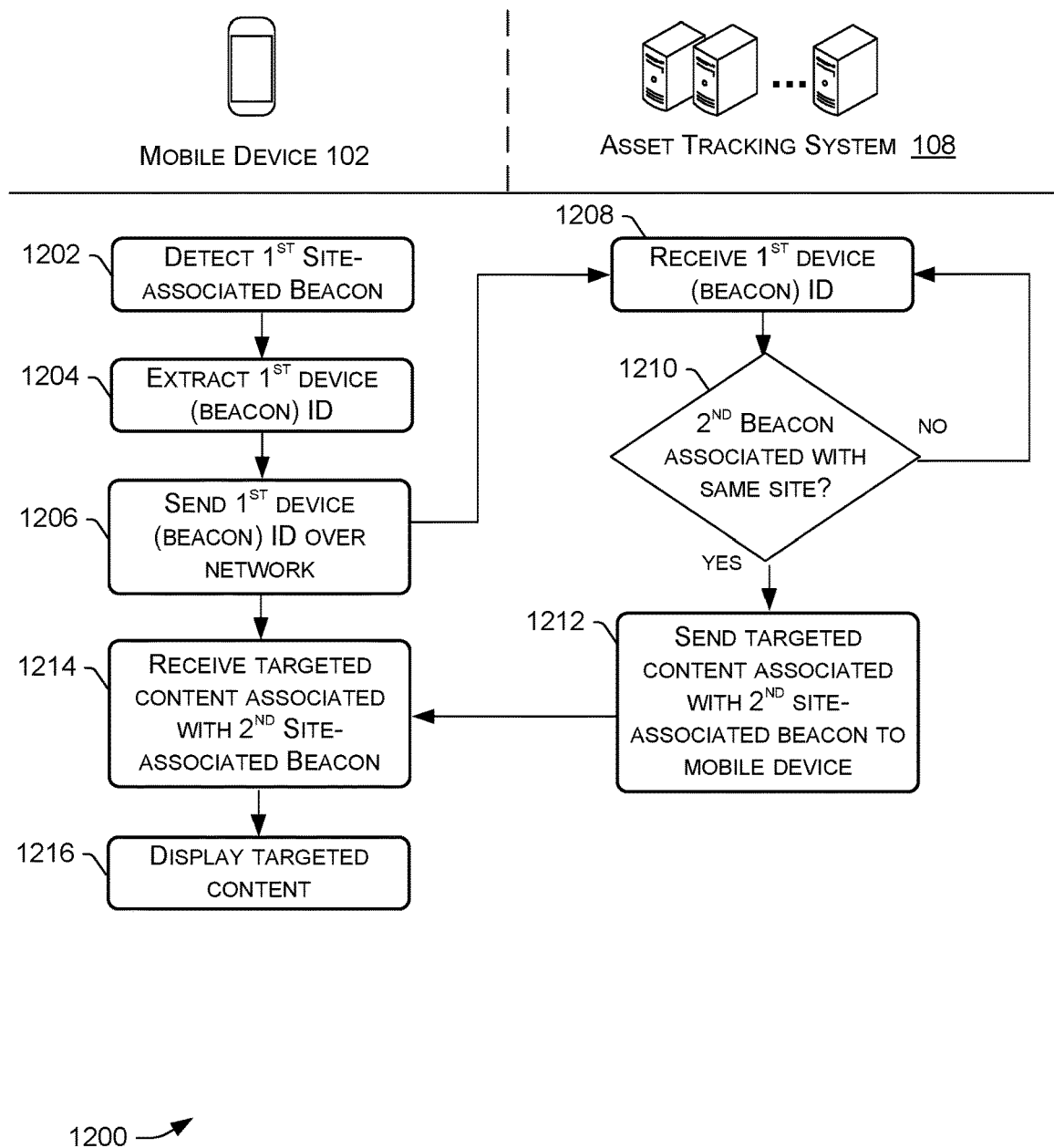
FIG. 12 illustrates a flowchart of an example process for sending targeted content to a mobile device based on detecting a secondary beacon at a site.

FIG. 12 illustrates a flowchart of an example process 1200 for sending targeted content to a mobile device 102 based on detecting a secondary beacon 104 at a site 112. The process 1200 may be constituted of two independent sub-processes: one performed by a mobile device 102, and another performed by the asset tracking system 108, which were introduced in the previous figures. For discussion purposes, the process 1200 is described with reference to the previous figures.

At 1202, a mobile device 102 may detect a first beacon 104(1) that is presently associated with a site 112. That is, the beacon data 114 may indicate that the beacon 104(1) was previously, and still is, associated with a site 112. Again, the detection of the first beacon 104(1) at block 1202 may involve the mobile device 102 receiving and interpreting (using logic, such as a SDK, of the mobile device 102) one or more packets broadcasted by the beacon 104(1) and carrying data. The mobile device 102 may be within transmission range of (e.g., within a threshold distance from) the beacon 104(1) in order to detect the beacon 104(1) at block 1202. In some embodiments, the logic of the mobile device 102 may be configured to "detect" beacons 104 when the mobile device 102 is brought within a predetermined distance (e.g., within 5 feet, ten feet, etc.) of the beacon 104 that is less than the transmission range of the beacon 104 (i.e., even if the transmission range exceeds this predetermined distance).

At 1204, the mobile device 102 may extract a device ID 118 from the broadcasted packets of the detected first beacon 104(1). This device ID 118 may take any suitable form, such as a MAC address of the beacon 104(1), or some other unique ID of the beacon 104(1). As mentioned, a secure beacon broadcast can be used at block 1204 to extract the device ID 118 of the beacon 104(1).

At 1206, the mobile device 102 may send the device ID 118 of the first beacon 104(1) (which was extracted at block 1204) to the asset tracking system 108 over a computer network 110 (e.g., the Internet). The mobile device 102 may, in some embodiments, send additional asset tracking data 128, such as the GPS data 120, to the asset tracking system 108 at block 1206.

At 1208, the asset tracking system 108 may receive, from the mobile device 102 over the computer network 110, the device ID 118 of the first beacon 104(1). The asset tracking system 108 may, in some embodiments, receive additional asset tracking data 128, such as the GPS data 120, from the mobile device 102 at block 1208.

At 1210, the asset tracking system 108 may determine whether any other beacon(s) 104 (e.g., a second beacon 104(2)) is/are associated with the same site 112 as the first beacon 104(1) identified by the received device ID 118. If there is not another beacon associated with the same site 112 as the first beacon 104(1), the process 1200 may follow the "NO" route from block 1210 back to block 1208, where the asset tracking system 108 may await further data from the mobile device 102 or another mobile device 102. If the asset tracking system 108 identifies, within the beacon data 114 and/or the master site data 116, a second beacon 104(2) associated with the same site 112 as the first beacon 104(1), the process 1200 may follow the "YES" route from block 1210 to block 1212, where the asset tracking system 108 may send, to the mobile device 102 that detected the first beacon 104(1) over a computer network 110, content associated with an asset 106 (e.g., a product display) to which the second beacon 104(2) is attached. For example, the content may be targeted to a user 300 of the mobile device 102, who is deduced to be located at the site 112 where the first and second beacons 104(1) and 104(2) are collocated.

At 1214, the mobile device 102 may receive, over the computer network 110 from the asset tracking system 108, the targeted content associated with the second beacon 104(2). The targeted content may not be displayed immediately upon receipt at block 1214. For example, the targeted content may be stored in local memory of the mobile device 102, and the display of the targeted content may occur at a later time (e.g., in response to a trigger event).

At 1216, the targeted content may be displayed on a display of the mobile device 102. In some embodiments, this may occur immediately upon receipt of the targeted content at block 1214. However, as noted above, the display of the targeted content at block 1216 may, in some embodiments, occur in response to a trigger event, such as the mobile device 102 detecting a broadcast from the second beacon 104(2), if the mobile device 102 is brought within a threshold distance of the second beacon 104(2). In some embodiments, the display of the targeted content occurs in response to user input, such as a selection of a soft button on a touch screen of the mobile device 102. For instance, the user 300 may be notified of an availability of the targeted content, and presented with a selectable soft button to display the targeted content, if the user 300 chooses to view the targeted content.

Figure 13:
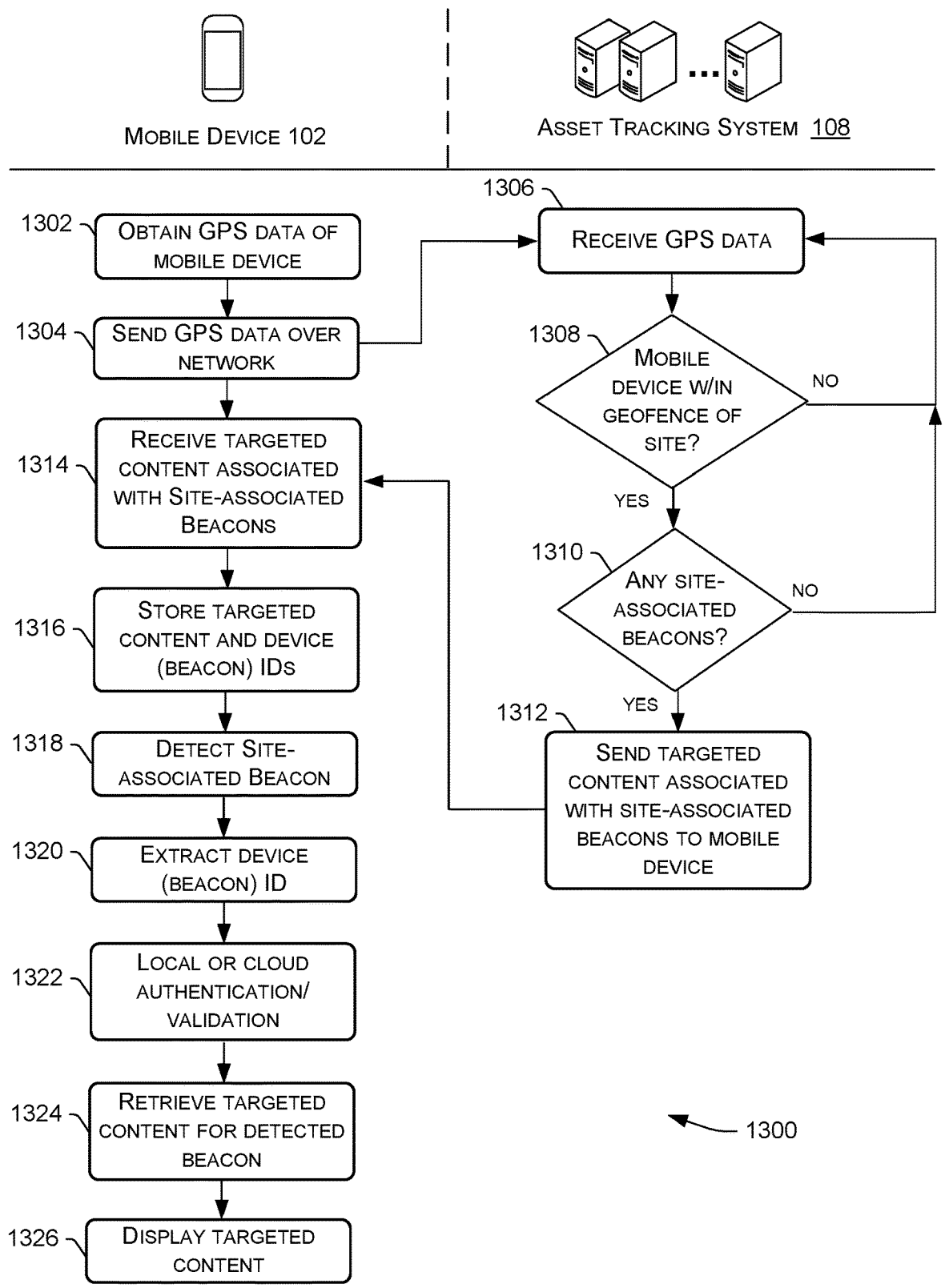
FIG. 13 illustrates a flowchart of an example process for enabling the offline presentation of targeted content associated with beacons using a geofence around a site.

FIG. 13 illustrates a flowchart of an example process 1300 for enabling the offline presentation of targeted content associated with beacons 104 using a geofence 308 around a site 112. The process 1300 may be constituted of two independent sub-processes: one performed by a mobile device 102, and another performed by the asset tracking system 108, which were introduced in the previous figures. For discussion purposes, the process 1300 is described with reference to the previous figures.

At 1302, a mobile device 102 may obtain GPS data 120 of the mobile device 102. The GPS data 120 may be obtained at a time at or near which the mobile device 102 entered a geofence 308 surrounding a site 112. The GPS data 120 may be obtained from the operating system of the mobile device 102 at block 1302. The GPS data 120 may include, without limitation, location data 124 specifying a GPS location (e.g., expressed in terms of coordinates, such as latitude and longitude). In some embodiments, the GPS data 120 obtained at block 1302 includes accuracy data 126 specifying an accuracy of the GPS location, and similar data.

At 1304, the mobile device 102 may send the GPS data 120 to the asset tracking system 108 over a computer network 110 (e.g., the Internet). The GPS data 120 may include at least the location data 124, and possibly accuracy data 126. The asset tracking system 108 may be located at a geographically remote location with respect to the present location of the mobile device 102.

At 1306, the asset tracking system 108 may receive, from the mobile device 102 over the computer network 110, the GPS data 120, which includes at least the location data 124.

At 1308, the asset tracking system 108 determine whether the GPS location specified in the location data 124 is within a geofence 308 surrounding the centroid coordinates 304 of a site 112. If the GPS location is not located within the geofence 308 of a site, the process 1300 may follow the "NO" route from block 1308 to block 1306 where the asset tracking system 108 awaits additional data. In other words, the asset tracking system 108 refrains from running the algorithm of FIG. 13 if a geofence entry event is not detected.

At 1310, the asset tracking system 108 may determine whether any beacon(s) 104 is/are associated with the site 112 associated with the geofence 308. If no beacon is associated with the geofenced site 112, the process 1300 may follow the "NO" route from block 1310 back to block 1306, where the asset tracking system 108 may await further data from the mobile device 102 or another mobile device 102. If the asset tracking system 108 identifies, within the beacon data 114 and/or the master site data 116, a beacon(s) 104 associated with the geofenced site 112, the process 1300 may follow the "YES" route from block 1310 to block 1312, where the asset tracking system 108 may send, to the mobile device 102 that entered the geofence 308 of the site 112, content associated with an asset(s) 106 (e.g., a product display) to which the identified beacon(s) 104 is/are attached. For example, the content may be targeted to a user 300 of the mobile device 102, who is deduced to be located at the geofenced site 112 where the beacon(s) 104 is/are located. Because the delivery of content occurs in a relatively short amount of time since the geofence entry event, the mobile device 102 is likely to be at a location where the mobile device 102 can access the asset tracking system 108 over the computer network 110 (e.g., the mobile device 102 is likely to have cellular coverage at a time when the targeted content is sent at block 1312).

At 1314, the mobile device 102 may receive, over the computer network 110 from the asset tracking system 108, the targeted content associated with the identified beacon(s) 104. The targeted content may not be displayed immediately upon receipt at block 1314.

At 1316, the targeted content may be stored in local memory of the mobile device 102 in association with the device ID(s) of the beacon(s) 104 identified by the asset tracking system 108 to be located at the geofenced site 112.

At 1318, a mobile device 102 may detect a beacon 104 that is presently associated with the geofenced site 112. The detection of the beacon 104 at block 1318 may involve the mobile device 102 receiving and interpreting (using logic, such as a SDK, of the mobile device 102) one or more packets broadcasted by the beacon 104 and carrying data. The mobile device 102 may be within transmission range of (e.g., within a threshold distance from) the beacon 104 in order to detect the beacon 104 at block 1318. In some embodiments, the logic of the mobile device 102 may be configured to "detect" beacons 104 when the mobile device 102 is brought within a predetermined distance (e.g., within 5 feet, ten feet, etc.) of the beacon 104 that is less than the transmission range of the beacon 104 (i.e., even if the transmission range exceeds this predetermined distance).

At 1320, the mobile device 102 may extract a device ID 118 from the broadcasted packets of the detected beacon 104. This device ID 118 may take any suitable form, such as a MAC address of the beacon 104, or some other unique ID of the beacon 104. As mentioned, a secure beacon broadcast can be used at block 1320 to extract the device ID 118 of the beacon 104.

At 1322, the mobile device 102, using logic (e.g., a SDK) may perform local or cloud authentication/validation. For example, if the mobile device 102 happens to be within a building at the site 112 that makes it difficult for the mobile device 102 to access the asset tracking system 108 (e.g., poor or no cellular coverage), the logic of the mobile device 102 may perform a local authentication/validation to ensure that the detection of the beacon 104 is authenticated/validated. Alternatively, a cloud-based authentication may be performed if there is a remote connection available to the mobile device 102.

At 1324, the mobile device 102 may retrieve, from local memory, the targeted content for the detected beacon 104.

For example, the logic of the mobile device 102 may lookup the device ID 118 of the detected beacon to find the targeted content in local memory that is associated with the detected beacon 104.

At 1326, the mobile device 102 may display the targeted content. In some embodiments, this may occur immediately upon retrieval of the targeted content at block 1324. In some embodiments, the display of the targeted content occurs in response to user input, such as a selection of a soft button on a touch screen of the mobile device 102. For instance, the user 300 may be notified of an availability of the targeted content, and presented with a selectable soft button to display the targeted content, if the user 300 chooses to view the targeted content.

Figure 14:
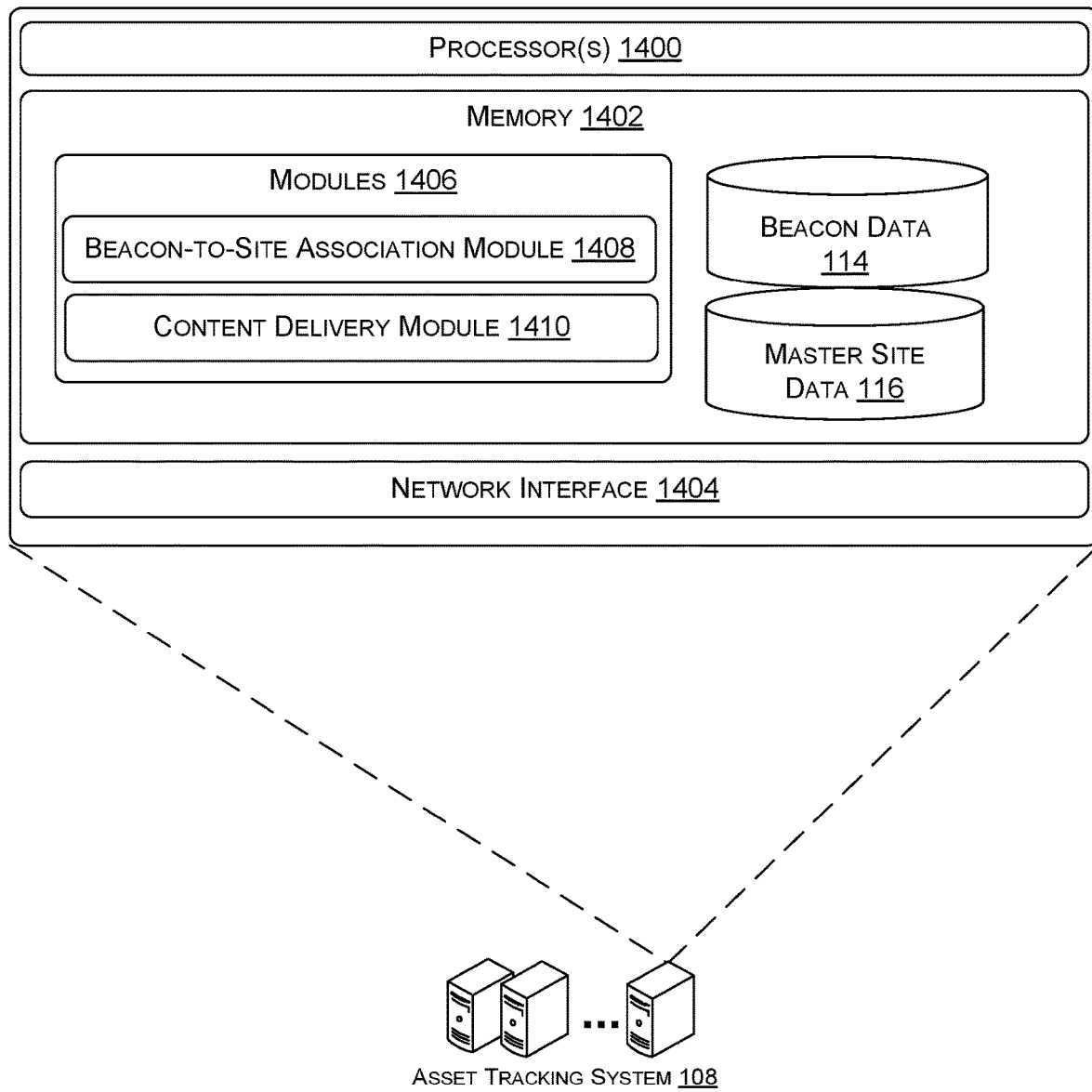
FIG. 14 is a block diagram of an example asset tracking system in accordance with various embodiments.

FIG. 14 is a block diagram of an example asset tracking system 108 in accordance with various embodiments. In the illustrated implementation, the asset tracking system 108 includes, among other components, one or more processors 1400, memory 1402 (or non-transitory computer-readable media 1402), and a network interface(s) 1404. The memory 1402 (or non-transitory computer-readable media 1402) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 1402 may be implemented as computer-readable storage media ("CRSM"), which may be any available physical media accessible by the processor(s) 1400 to execute instructions stored on the memory 1402. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1402. Various modules 1406 may represent instructions stored in the memory 1402 that, when executed by the processor(s) 1400, cause the asset tracking system 108 to perform the techniques and operations described herein. For example, a beacon-to-site association module 1408 may be configured to make determinations as to whether to associate, or dissociate as the case may be, beacons with, or from, sites, using any individual one or combination of the techniques described herein. As another example, the content delivery module 1410 may be configured to deliver targeted content to mobile devices 102 using any individual one or combination of the techniques described herein. The memory 1402 is also shown as storing the beacon data 114 and the master site data 116, as described herein.

Figure 15:
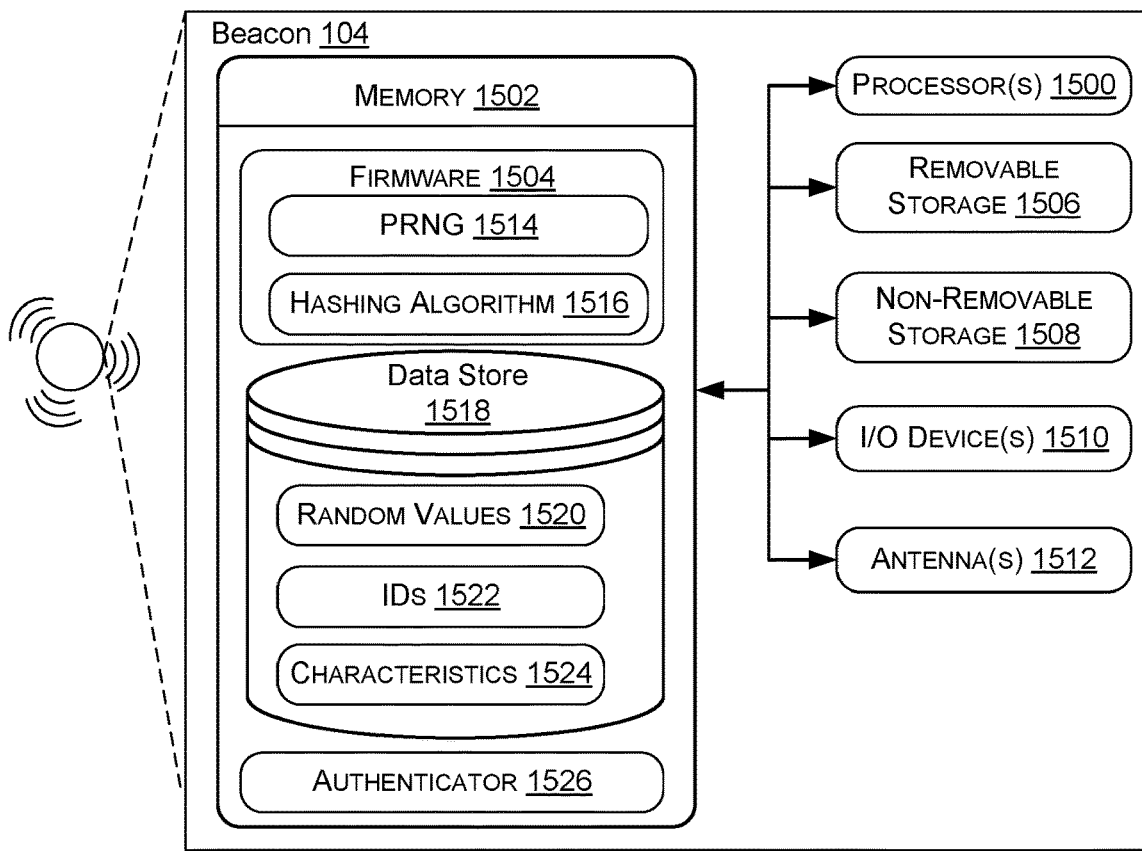
FIG. 15 is a block diagram of an example wireless beacon in accordance with various embodiments.

FIG. 15 is a block diagram of an example wireless beacon 104 in accordance with various embodiments. The beacon 104 may include one or more processors 1500 and one or more forms of computer-readable memory 1502. The one or more processors 1500 may be implemented in hardware and/or software, and may include any suitable processor, controller, or the like that is configured to execute instructions stored in the memory 1502 and/or firmware 1504. In some embodiments, the one or more processors 1500 may comprise a central processing unit(s), a microcontroller(s), an application specific integrated circuit (ASIC), a system on chip (SoC), or a similar integrated circuit (IC). The beacon 104 may also include additional storage devices. Such additional storage may include removable storage 1506 and/or non-removable storage 1508.

The beacon 104 may further include input and output devices 1510. Input devices of the beacon 104 may include, without limitation, physical buttons (e.g., keyboard or keypad), a microphone, a touch screen, or any other suitable input device(s) coupled communicatively to the processor(s) 1500 and the computer-readable memory 1502. Output devices of the beacon 104 may include, without limitation, a display, speakers, a light emitting diode(s) (LED(s)), or any other suitable output device coupled communicatively to the processor(s) 1500 and the computer-readable memory 1502.

The beacon 104 may further include one or more antenna(s) 1512 that allow the beacon 104 to wirelessly communicate with other computing devices, such as the mobile computing device 102 shown in FIG. 1. The antenna(s) 1512 may be a transceiver (i.e., a transmitter and receiver, capable of transmitting data and receiving data) facilitate communication using any suitable wireless communication protocol, such as low energy protocols (e.g., BLE). In this manner, the beacon 104 may broadcast the packets using the antenna(s) 1512 over the transmission range of the beacon 104.

Computer-readable media, as used herein, may include, at least, two types of computer-readable media, namely computer storage media and communication media. Computer storage media may include volatile and nonvolatile, removable and non-removable media implemented in any method or technology for storage of information, such as computer readable instructions, data structures, program modules, or other data. The memory 1502, firmware 1504, removable storage 1506, and non-removable storage 1508 are all examples of computer storage media. Computer storage media includes, but is not limited to, RAM, ROM, electrically erasable programmable read-only memory (EEPROM), flash memory or other memory technology, compact disk read-only memory (CD-ROM), digital versatile disks (DVD), or other optical storage, magnetic cassettes, magnetic tape, magnetic disk storage or other magnetic storage devices, or any other non-transmission medium that can be used to store the desired information and which can be accessed by the beacon 104. Any such computer storage media may be part of the beacon 104.

In contrast, communication media may embody computer-readable instructions, data structures, program modules, or other data in a modulated data signal, such as a carrier wave, or other transmission mechanism. As defined herein, computer storage media does not include communication media.

In some embodiments, the firmware 1504 may include a pseudo-random number generator (PRNG) 1514 and associated algorithm(s) to generate random values to be included in a first packet of a multi-packet broadcast signal. The PRNG 1514 may utilize any suitable pseudo-random function or algorithm, such as a polynomial time computational function, or the like. The firmware 1504 may further include the hashing algorithm 1516 configured to generate a second ID using the randomly generated value as a seed for the hashing algorithm 1516.

The memory 1502 may further include a data store 1518 to store various information and data, such as various random values 1520, various identifiers (IDs) 1522, and one or more characteristics 1524 of the beacon 104. The random values 1520 may include, among other values, a randomly generated value to be included in a first packet of a multi-packet broadcast signal. The random values 1520 may be periodically regenerated by the PRNG 1514 and updated in the data store 1518.

The IDs 1522 may include IDs to be included in the multiple packets of a multi-packet broadcast signal, as well as a device ID 118 of the beacon 104 to be included in at least one of the broadcasted packets. In some embodiments, the device ID 118 may be randomly generated by the PRNG 1514, and may include a MAC address of the beacon 104 that uniquely identifies the beacon 104.

The characteristics 1524 of the beacon 104 may be stored as beacon attributes, such as the broadcast/transmission range or transmitter power (TxPower) of the beacon 104, the broadcast (advertisement) frequency—which may comprise the time interval for broadcasting/re-broadcasting packets, battery life profile of the beacon 104 (i.e., specifications for how the beacon 104 operates to align with an estimated battery life), and so on. Some or all of the characteristics 1524 may be readable and writable such that a value(s) for each characteristic 1524 may be stored in the data store 1518 and may be updated upon a write command to change a characteristic 1524 value to a new value. A write command to update one or more of the characteristics 1524 of the beacon 104 may be issued from a mobile device 102 that is in proximity of the beacon 104, and that is properly configured with an SDK or appropriate logic to modify the characteristics 1524 of the beacon 104.

Accordingly, the memory 1502 may further include an authenticator 1526 that is configured to authenticate write commands from other computing devices to the beacon 104, such as write commands received from a mobile device 102 to update one or more of the characteristics 1524. The authenticator 1526 may utilize a cryptographic key, such as a symmetric key of a symmetric key function to authenticate any write command message from a proximate mobile device 102 to ensure that the write command came from an authorized mobile device 102, as opposed to an unauthorized third party device. The authenticator 1526 ensures that only authorized devices can modify the characteristics 1524 of the beacon 104.

In one illustrative example, an authorized user of the beacon 104 (e.g., an entity that deployed the beacon 104 in the field, such as the beacon manufacturer) may utilize an online management console provided by a server (i.e., a cloud-based management console) to change the transmission range of the beacon (an example characteristic 1524) from say 20 feet to about 100 feet. The server may then instruct a properly configured mobile device 102 near the beacon 104 to write the modified characteristic 1524 to the beacon's memory 1502 using a secure protocol that can be authenticated by the authenticator 1526.

Figure 16:
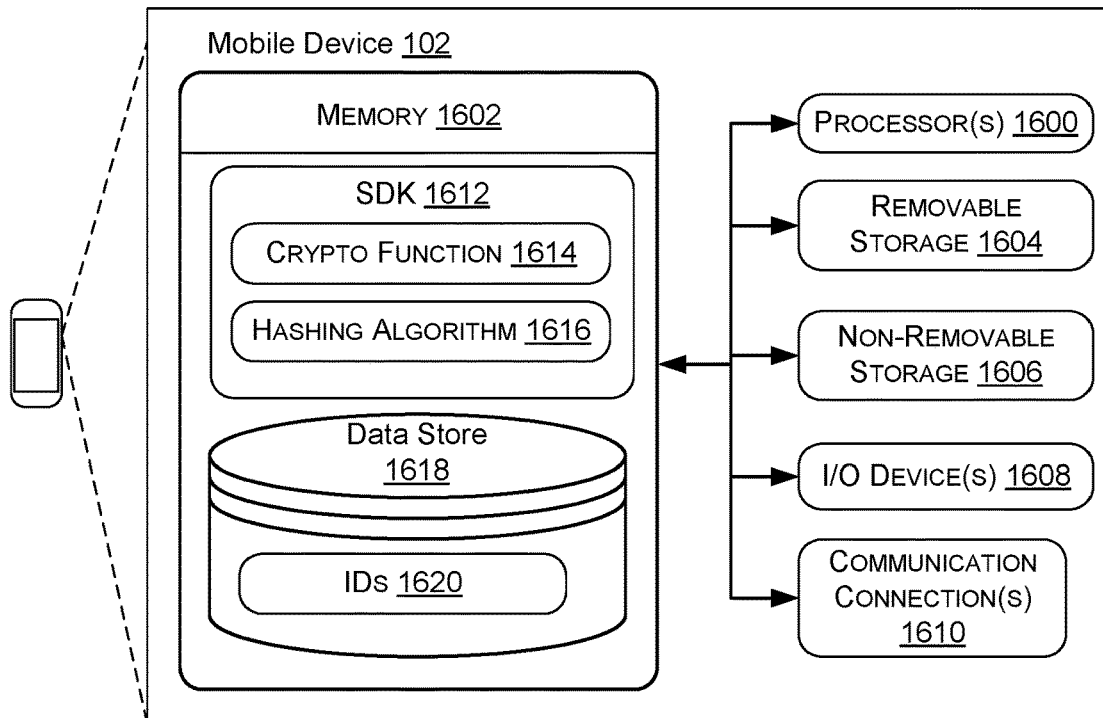
FIG. 16 is a block diagram of an example mobile device in accordance with various embodiments.

FIG. 16 a block diagram of an example mobile device 102 that is configured to detect and interpret a broadcast from a proximate beacon 104, and is further configured to communicate with the asset tracking system 108 for performing the various techniques described herein. The mobile device 102 may include one or more processors 1600 and one or more forms of computer-readable memory 1602. The one or more processors 1600 and one or more forms of computer-readable memory 1602 may include any of the above-described forms that were described in reference to the processor(s) 1500 and memory 1502 for the beacon 104. The mobile device 102 may also include additional storage devices. Such additional storage may include removable storage 1604 and/or non-removable storage 1606. The memory 1602, the removable storage 1604, and the non-removable storage 1606 are all examples of computer storage media, as described above with reference to the storage media of the beacon 104.

The mobile device 102 may further include input and output devices 1608. Input devices of the mobile device may include, without limitation, physical buttons (e.g., keyboard or keypad), a microphone, a touch screen, a pointer device (e.g., a stylus, pen, or similar input mechanism), or any other suitable input device(s) coupled communicatively to the processor(s) 1600 and the computer-readable memory 1602. Output devices of the mobile device 102 may include, without limitation, a display, speakers, a printer, tactile feedback mechanisms, or any other suitable output device coupled communicatively to the processor(s) 1600 and the computer-readable memory 1602.

The mobile device 102 may further include one or more communication connections 1610 that allow the mobile device 102 to communicate with other computing devices, such as the beacon 104 shown in FIG. 1, or other computing devices over a network, such as the Internet. The communication connection(s) 1610 may include one or more antenna(s) to facilitate communication using any suitable wireless communication protocol, such as low energy protocols like BLE. In this manner, the mobile device 102 may receive broadcasts from the beacon 104 and may transmit write commands and other messages back to the beacon 104. In addition to being configured with a short range radio, such as a Bluetooth radio, to communicate wirelessly with the beacon 104, the communication connection(s) 1610 may be configured to communicate wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), Institute of Electrical and Electronics Engineers (IEEE) 802.1x protocols, WiMAX, wireless fidelity (Wi-Fi™), and/or any future IP-based network technology or evolution of an existing IP-based network technology.

In some embodiments, the mobile device 102 may include a software development kit (SDK) 1612 or similar logic to detect and interpret the packets that are broadcasted from the beacon 104, to write characteristics 1524 to the beacon 104, and to transmit/receive data to/from the asset tracking system 108, among other things. The SDK 1612 may be pre-installed on the mobile device 102 upon manufacture of the mobile device 102 or downloaded from remote source (e.g., server) over a network (e.g., the Internet), or a local source, such as a flash memory card, or the like.

The SDK 1612 may include the cryptographic function 1614 that may be utilized to derive or decipher an ID transmitted by the beacon 104. The cryptographic function 1614 may be based on knowledge of the hashing algorithm 1516 utilized by the beacon 104 firmware 1504 to generate an ID. In some embodiments, the SDK 1612 of the mobile device 102 may further include a hashing algorithm 1616 that can be utilized for, among other things, generating a hash of a characteristic 1524 that is to be written to the beacon 104 in order to provide an authentic and verifiable write command to the beacon 104. In some embodiments, the hashing algorithm 1616 may be configured to generate a hash of a characteristic 1524 using the characteristic data as a seed for the hashing algorithm 1616.

The memory 1602 may further include a data store 1618 to store various information and data, such as various identifiers (IDs) 1620 which may correspond to, or match, one or more of the IDs 1522 stored by the beacon 104. For example, the IDs 1620 may include a first ID to be included in a first packet that the mobile device 102 is to initially scan for, a randomly generated second ID to be included in a second packet that the mobile device 102 is to scan for, and any device IDs 118 that the mobile device 102 extracts from the second packet and with which the mobile device 102 can associate context and metadata with the beacon 104.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

What is claimed is:

1. A computer-implemented method comprising:
receiving, from a mobile device over a computer network, a first device identifier (ID) that uniquely identifies a first wireless beacon;
determining that the first wireless beacon is presently associated with a site among a plurality of sites maintained in a data store;
receiving, from the mobile device over the computer network, a second device ID that uniquely identifies a second wireless beacon;
determining a time difference between the receiving of the first device ID and the receiving of the second device ID;
comparing the time difference to a threshold amount of time;
determining that the time difference is less than the threshold amount of time;
associating the second wireless beacon with the site based at least in part on the time difference being less than the threshold amount of time; and
storing beacon-to-site association data in the data store based at least in part on the associating the second wireless beacon with the site.

2. The computer-implemented method of claim 1, further comprising, after the associating the second wireless beacon with the site:
receiving, from the mobile device or a different mobile device over the computer network, asset tracking data that includes:
the second device ID that uniquely identifies the second wireless beacon;
global positioning system (GPS) data of the mobile device or the different mobile device, the GPS data including:
location data specifying a GPS location; and
accuracy data specifying an accuracy of the GPS location;
determining that the accuracy data satisfies an accuracy threshold;
determining that a distance between the GPS location and centroid coordinates of the site is greater than a static radius assigned to the site;
dissociating the second wireless beacon from the site based at least in part on the distance between the GPS location and the centroid coordinates of the site being greater than the static radius assigned to the site; and
removing the beacon-to-site association data from the data store based at least in part on the dissociating the second wireless beacon from the site.

3. The computer-implemented method of claim 1, wherein the site is a first site, the method further comprising, after the associating the second wireless beacon with the first site:
receiving, from the mobile device or a different mobile device over the computer network, a third device ID that uniquely identifies a third wireless beacon associated with a second site different from the first site;
within the threshold amount of time or a different threshold amount of time since the receiving of the third device ID, receiving, from the mobile device or the different mobile device over the computer network, the second device ID that uniquely identifies the second wireless beacon associated with the first site;
dissociating the second wireless beacon from the first site based at least in part on the receiving of the second device ID within the threshold amount of time or the different threshold amount of time since the receiving of the third device ID; and
removing the beacon-to-site association data from the data store based at least in part on the dissociating the second wireless beacon from the first site.

4. The computer-implemented method of claim 1, wherein the site is a first site, the method further comprising, after the associating the second wireless beacon with the first site:
receiving, from the mobile device or a different mobile device over the computer network, global positioning system (GPS) data of the mobile device or the different mobile device, the GPS data including location data specifying a GPS location;
determining that the GPS location is within a geofence surrounding centroid coordinates of a second site different from the first site;

within the threshold amount of time or a different threshold amount of time since the determining that the GPS location is within the geofence, receiving, from the mobile device or the different mobile device over the computer network, the second device ID that uniquely identifies the second wireless beacon associated with the first site;

dissociating the second wireless beacon from the first site based at least in part on the receiving of the second device ID within the threshold amount of time or the different threshold amount of time since the determining that the GPS location is within the geofence; and removing the beacon-to-site association data from the data store based at least in part on the dissociating the second wireless beacon from the first site.

5. The computer-implemented method of claim 1, wherein the site is a first site, the method further comprising, after the associating the second wireless beacon with the first site:

receiving, from the mobile device or a different mobile device over the computer network, first global positioning system (GPS) data of the mobile device or the different mobile device, the first GPS data including first location data specifying a first GPS location;

determining that the first GPS location is within a geofence surrounding centroid coordinates of a second site different from the first site;

prior to receiving second GPS data of the mobile device or the different mobile device that includes second location data specifying a second GPS location outside of the geofence, receiving, from the mobile device or the different mobile device over the computer network, the second device ID that uniquely identifies the second wireless beacon associated with the first site;

dissociating the second wireless beacon from the first site based at least in part on the receiving of the second device ID prior to the receiving of the second GPS data that includes the second location data specifying the second GPS location that is outside of the geofence; and removing the beacon-to-site association data from the data store based at least in part on the dissociating the second wireless beacon from the first site.

6. The computer-implemented method of claim 1, further comprising, prior to the associating the second wireless beacon with the site:

receiving, from the mobile device or a different mobile device over the computer network, asset tracking data that includes:

the second device ID that uniquely identifies the second wireless beacon;

global positioning system (GPS) data of the mobile device or the different mobile device, the GPS data including:

location data specifying a GPS location; and accuracy data specifying an accuracy of the GPS location;

determining that the accuracy of the GPS location satisfies an accuracy threshold;

determining that a distance between the GPS location and centroid coordinates of the site is greater than a static radius assigned to the site; and making a determination to refrain from associating the second wireless beacon with the site based at least in part on the distance being greater than the static radius, wherein the associating the second wireless beacon with the site overrides the determination to refrain from associating the second wireless beacon with the site.

7. The computer-implemented method of claim 1, wherein the storing of the beacon-to-site association data comprises storing a site identifier, that uniquely identifies the site, in association with the second device ID and in association with a merchant identifier associated with an asset with which the second wireless beacon is associated.

8. An asset tracking system comprising:

one or more processors; and memory storing computer-executable instructions that, when executed by the one or more processors, cause the asset tracking system to:

receive, from a mobile device over a computer network, a first device identifier (ID) that uniquely identifies a first wireless beacon;

determine that the first wireless beacon is presently associated with a site among a plurality of sites maintained in a data store accessible to the asset tracking system;

receive, from the mobile device over the computer network, a second device ID that uniquely identifies a second wireless beacon;

determine that a time difference between receiving the first device ID and receiving the second device ID is less than a threshold amount of time;

associate the second wireless beacon with the site based at least in part on the time difference being less than the threshold amount of time; and store beacon-to-site association data in the data store based at least in part on associating the second wireless beacon with the site.

9. The asset tracking system of claim 8, wherein the computer-executable instructions, when executed by the one or more processors, further cause the asset tracking system to, after associating the second wireless beacon with the site:

receive, from the mobile device or a different mobile device over the computer network, asset tracking data that includes:

the second device ID that uniquely identifies the second wireless beacon;

global positioning system (GPS) data of the mobile device or the different mobile device, the GPS data including:

location data specifying a GPS location; and accuracy data specifying an accuracy of the GPS location;

determine that the accuracy data satisfies an accuracy threshold;

determine that a distance between the GPS location and centroid coordinates of the site is greater than a static radius assigned to the site;

dissociate the second wireless beacon from the site based at least in part on the distance between the GPS location and the centroid coordinates of the site being greater than the static radius assigned to the site; and remove the beacon-to-site association data from the data store based at least in part on dissociating the second wireless beacon from the site.

10. The asset tracking system of claim 8, wherein the site is a first site, and wherein the computer-executable instructions, when executed by the one or more processors, further cause the asset tracking system to, after associating the second wireless beacon with the first site:

receive, from the mobile device or a different mobile device over the computer network, a third device ID that uniquely identifies a third wireless beacon associated with a second site different from the first site;
within the threshold amount of time or a different threshold amount of time since receiving the third device ID, receive, from the mobile device or the different mobile device over the computer network, the second device ID that uniquely identifies the second wireless beacon associated with the first site;
dissociate the second wireless beacon from the first site based at least in part on receiving the second device ID within the threshold amount of time or the different threshold amount of time since receiving the third device ID; and
remove the beacon-to-site association data from the data store based at least in part on dissociating the second wireless beacon from the first site.

11. The asset tracking system of claim 8, wherein the site is a first site, and wherein the computer-executable instructions, when executed by the one or more processors, further cause the asset tracking system to, after associating the second wireless beacon with the first site:
receive, from the mobile device or a different mobile device over the computer network, global positioning system (GPS) data of the mobile device or the different mobile device, the GPS data including location data specifying a GPS location;
determine that the GPS location is within a geofence surrounding centroid coordinates of a second site different from the first site;
within the threshold amount of time or a different threshold amount of time since determining that the GPS location is within the geofence, receive, from the mobile device or the different mobile device over the computer network, the second device ID that uniquely identifies the second wireless beacon associated with the first site;
dissociate the second wireless beacon from the first site based at least in part on receiving the second device ID within the threshold amount of time or the different threshold amount of time since determining that the GPS location is within the geofence; and
remove the beacon-to-site association data from the data store based at least in part on dissociating the second wireless beacon from the first site.

12. The asset tracking system of claim 8, wherein the site is a first site, and wherein the computer-executable instructions, when executed by the one or more processors, further cause the asset tracking system to, after associating the second wireless beacon with the first site:
receive, from the mobile device or a different mobile device over the computer network, first global positioning system (GPS) data of the mobile device or the different mobile device, the first GPS data including first location data specifying a first GPS location;
determine that the first GPS location is within a geofence surrounding centroid coordinates of a second site different from the first site;
prior to receiving second GPS data of the mobile device or the different mobile device that includes second location data specifying a second GPS location outside of the geofence, receive, from the mobile device or the different mobile device over the computer network, the second device ID that uniquely identifies the second wireless beacon associated with the first site;
dissociate the second wireless beacon from the first site based at least in part on receiving the second device ID prior to receiving the second GPS data that includes the second location data specifying the second GPS location that is outside of the geofence; and
remove the beacon-to-site association data from the data store based at least in part on dissociating the second wireless beacon from the first site.

13. The asset tracking system of claim 8, wherein the computer-executable instructions, when executed by the one or more processors, further cause the asset tracking system to, prior to associating the second wireless beacon with the site:
receive, from the mobile device or a different mobile device over the computer network, asset tracking data that includes:
the second device ID that uniquely identifies the second wireless beacon;
global positioning system (GPS) data of the mobile device or the different mobile device, the GPS data including:
location data specifying a GPS location; and
accuracy data specifying an accuracy of the GPS location;
determine that the accuracy of the GPS location satisfies an accuracy threshold;
determine that a distance between the GPS location and centroid coordinates of the site is greater than a static radius assigned to the site; and
make a determination to refrain from associating the second wireless beacon with the site based at least in part on the distance being greater than the static radius,
wherein associating the second wireless beacon with the site overrides the determination to refrain from associating the second wireless beacon with the site.

14. The asset tracking system of claim 8, wherein storing the beacon-to-site association data comprises storing a site identifier, that uniquely identifies the site, in association with the second device ID and in association with a merchant identifier associated with an asset with which the second wireless beacon is associated.

15. A computer-implemented method comprising:
receiving, from a mobile device over a computer network:
a first device identifier (ID) that uniquely identifies a first wireless beacon; and
a first timestamp indicating a first time at which the first wireless beacon was detected by the mobile device;
determining that the first wireless beacon is presently associated with a site among a plurality of sites maintained in a data store;
receiving, from the mobile device over the computer network:
a second device ID that uniquely identifies a second wireless beacon; and
a second timestamp indicating a second time at which the second wireless beacon was detected by the mobile device;
determining that a time difference between the first time and the second time is less than a threshold amount of time;
associating the second wireless beacon with the site based at least in part on the time difference being less than the threshold amount of time; and
storing beacon-to-site association data in the data store based at least in part on the associating the second wireless beacon with the site.

16. The computer-implemented method of claim 15, further comprising, after the associating the second wireless beacon with the site:

receiving, from the mobile device or a different mobile device over the computer network, asset tracking data that includes:
  the second device ID that uniquely identifies the second wireless beacon;
  global positioning system (GPS) data of the mobile device or the different mobile device, the GPS data including:
    location data specifying a GPS location; and
    accuracy data specifying an accuracy of the GPS location;
determining that the accuracy data satisfies an accuracy threshold;
determining that a distance between the GPS location and centroid coordinates of the site is greater than a static radius assigned to the site;
dissociating the second wireless beacon from the site based at least in part on the distance between the GPS location and the centroid coordinates of the site being greater than the static radius assigned to the site; and
removing the beacon-to-site association data from the data store based at least in part on the dissociating the second wireless beacon from the site.

17. The computer-implemented method of claim 15, wherein the site is a first site, the method further comprising, after the associating the second wireless beacon with the first site:
  receiving, from the mobile device or a different mobile device over the computer network, a third device ID that uniquely identifies a third wireless beacon associated with a second site different from the first site;
  within the threshold amount of time or a different threshold amount of time since the receiving of the third device ID, receiving, from the mobile device or the different mobile device over the computer network, the second device ID that uniquely identifies the second wireless beacon associated with the first site;
  dissociating the second wireless beacon from the first site based at least in part on the receiving of the second device ID within the threshold amount of time or the different threshold amount of time since the receiving of the third device ID; and
  removing the beacon-to-site association data from the data store based at least in part on the dissociating the second wireless beacon from the first site.

18. The computer-implemented method of claim 15, wherein the site is a first site, the method further comprising, after the associating the second wireless beacon with the first site:
  receiving, from the mobile device or a different mobile device over the computer network, global positioning system (GPS) data of the mobile device or the different mobile device, the GPS data including location data specifying a GPS location;
  determining that the GPS location is within a geofence surrounding centroid coordinates of a second site different from the first site;
  within the threshold amount of time or a different threshold amount of time since the determining that the GPS location is within the geofence, receiving, from the mobile device or the different mobile device over the computer network, the second device ID that uniquely identifies the second wireless beacon associated with the first site;
  dissociating the second wireless beacon from the first site based at least in part on the receiving of the second device ID within the threshold amount of time or the different threshold amount of time since the determining that the GPS location is within the geofence; and
  removing the beacon-to-site association data from the data store based at least in part on the dissociating the second wireless beacon from the first site.

19. The computer-implemented method of claim 15, wherein the site is a first site, the method further comprising, after the associating the second wireless beacon with the first site:
  receiving, from the mobile device or a different mobile device over the computer network, first global positioning system (GPS) data of the mobile device or the different mobile device, the first GPS data including first location data specifying a first GPS location;
  determining that the first GPS location is within a geofence surrounding centroid coordinates of a second site different from the first site;
  prior to receiving second GPS data of the mobile device or the different mobile device that includes second location data specifying a second GPS location outside of the geofence, receiving, from the mobile device or the different mobile device over the computer network, the second device ID that uniquely identifies the second wireless beacon associated with the first site;
  dissociating the second wireless beacon from the first site based at least in part on the receiving of the second device ID prior to the receiving of the second GPS data that includes the second location data specifying the second GPS location that is outside of the geofence; and
  removing the beacon-to-site association data from the data store based at least in part on the dissociating the second wireless beacon from the first site.

20. The computer-implemented method of claim 15, wherein the storing of the beacon-to-site association data comprises storing a site identifier, that uniquely identifies the site, in association with the second device ID and in association with a merchant identifier associated with an asset with which the second wireless beacon is associated.

* * * * *